(12) United States Patent
Zhu et al.

(10) Patent No.: US 11,093,202 B2
(45) Date of Patent: Aug. 17, 2021

(54) METHOD AND APPARATUS FOR DUAL DISPLAY AND DUAL SIM OPERATIONS

(71) Applicant: MOTOROLA MOBILITY LLC, Chicago, IL (US)

(72) Inventors: Xiaofeng Zhu, Nanjing (CN); Weiqi Tang, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/749,751

(22) Filed: Jan. 22, 2020

(65) Prior Publication Data

US 2021/0200494 A1 Jul. 1, 2021

(30) Foreign Application Priority Data

Dec. 31, 2019 (CN) .......................... 201911406152.0

(51) Int. Cl.
*G06F 3/14* (2006.01)
*G06F 3/0482* (2013.01)
*H04B 1/3816* (2015.01)
*G06F 3/0484* (2013.01)
*H04W 88/06* (2009.01)

(52) U.S. Cl.
CPC .......... *G06F 3/1423* (2013.01); *G06F 3/0482* (2013.01); *G06F 3/0484* (2013.01); *H04B 1/3816* (2013.01); *H04W 88/06* (2013.01)

(58) Field of Classification Search
CPC .... G06F 3/1423; G06F 3/0484; G06F 3/0482; H04B 1/3816; H04W 88/06
See application file for complete search history.

(56) References Cited

U.S. PATENT DOCUMENTS

| 8,504,936 | B2* | 8/2013 | Gimpl | G06F 1/1616 715/778 |
| 8,621,397 | B2* | 12/2013 | Chae | H04M 1/72522 715/863 |
| 8,750,931 | B2* | 6/2014 | Park | H04W 8/183 455/558 |
| 10,320,962 | B1* | 6/2019 | Chang | G06F 3/147 |
| 10,409,438 | B2* | 9/2019 | Reeves | G06F 3/0486 |
| 10,716,019 | B1* | 7/2020 | Velusamy | H04W 24/06 |
| 2011/0096245 | A1* | 4/2011 | Ning | H04N 21/6181 348/739 |

(Continued)

*Primary Examiner* — Grant Sitta
(74) *Attorney, Agent, or Firm* — Isidore PLLC

(57) ABSTRACT

A wireless communication device includes at least two subscriber identification modules (SIMs), including a first SIM and a second SIM. The wireless communication device includes multiple electronic displays, including at least a first electronic display and a second electronic display. The wireless communication device includes a processor coupled to each of the at least two SIMs and the multiple electronic displays. The processor executes program code that enables the wireless communication device to: selectively channel data operations associated with a graphical user interface (GUI) of a currently active electronic display to one SIM that is user-assigned to the currently active electronic display. The processor executes program code that enables the wireless communication device to: associating input/output (I/O) functions with the currently active electronic display from among the multiple electronic displays.

20 Claims, 9 Drawing Sheets

(56) References Cited

U.S. PATENT DOCUMENTS

| | | | |
|---|---|---|---|
| 2015/0116218 A1* | 4/2015 | Yang | G06F 3/0486 345/158 |
| 2017/0244826 A1* | 8/2017 | Wang | H04M 1/72448 |
| 2017/0357413 A1* | 12/2017 | Green | G06F 3/04883 |
| 2019/0042066 A1* | 2/2019 | Kim | G06F 3/04817 |

* cited by examiner

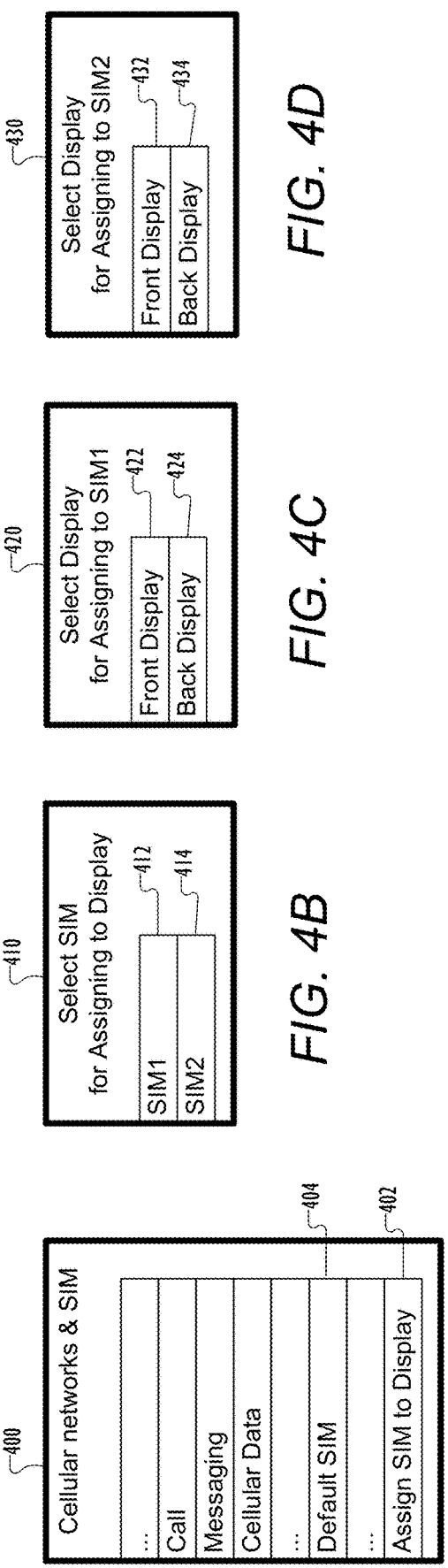

Back Display/Auxiliary Display

Front Display/Main Display

FIG. 7B

From FIG. 7A

On each of the multiple electronic displays, apply a different visual indicator to each status bar that is displayed on the currently active electronic display to indicate which SIM is the active SIM and which status bar is associated with the active SIM
724

On each of the multiple electronic displays, apply a different visual indicator to each status bar that is displayed on the currently active electronic display to indicate which SIM is the active SIM and which application icon is associated with the active SIM
726

On each of the multiple electronic displays, apply a visual indication to status bars associated with a non-active SIM that is not assigned to the electronic display currently displaying the active screen in order to indicate which status bars are associated with the non-active SIM
728

END
730

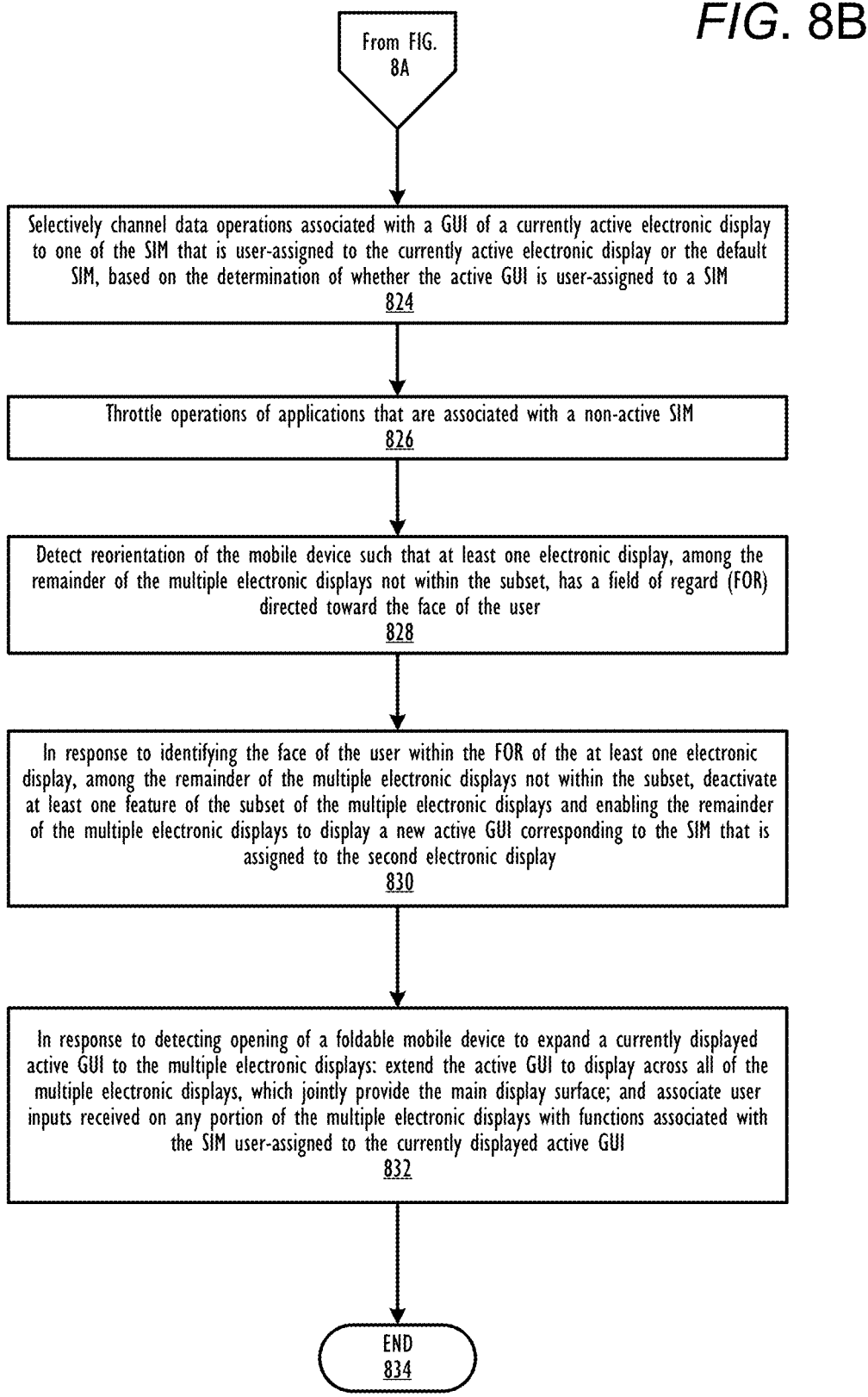

METHOD AND APPARATUS FOR DUAL DISPLAY AND DUAL SIM OPERATIONS

CLAIM TO FOREIGN PRIORITY

This application claims priority to Chinese Application No. 201911406152.0 filed Dec. 31, 2019, the content of which is fully incorporated herein by reference.

BACKGROUND

1. Technical Field

The present disclosure generally relates to mobile devices with multiple electronic display surfaces and multiple subscriber identity modules (SIMs), and more particularly to selectively channeling data operations in a mobile device having multiple electronic display surfaces and multiple SIMs.

2. Description of the Related Art

Dual-SIM mobile devices are becoming more common. These dual-SIM devices include a first SIM associated with a first carrier network (e.g., CDMA network, or GSM/GPRS network) and a second SIM associated with a second carrier network (e.g., CDMA network or GSM/GPRS network). In the settings of a dual-SIM mobile device, a default SIM is selected from the first and second SIMs. Once the default SIM is set, the mobile device automatically channels all data operations to the default SIM. Additionally, in the outbound call settings of the dual-SIM mobile device, the dual-SIM can be set to channel all outbound calls to the default SIM, or can be set to provide a prompt upon demand of each outbound call, prompting for a selection of which SIM to use for the outbound. When the outbound call settings are set to on-demand selection of a SIM, the user experiences monotony in making the selection of the SIM for each and every outbound call. When the outbound call settings are set to always use the default SIM, the user has to perform a series of steps in order to temporarily switch to use the non-default SIM for outbound call operations.

Some mobile devices are designed as dual-display mobile devices that include a main display on the front surface of the dual-display mobile device and an auxiliary display on the back surface. In a dual-display dual-SIM mobile device, both the main display and the auxiliary display channel all data operations to the default SIM. Further, in the dual-display dual-SIM mobile device, inbound calls received through the first SIM and inbound calls received through the second SIM are directed to the same electronic display, which displays the name of the SIM receiving an inbound call. For each inbound call, the user can easily misread which of first SIM and second SIM is receiving the call.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 4A-4F illustrate example SIM-to-Display settings menus for user-assigning a selected SIM of the mobile device of FIG. 1 to a selected electronic display, in accordance with one or more embodiments;

FIGS. 7A and 7B (FIG. 7) is a flow chart illustrating a method for user-assigning a selected one of the multiple SIMs of the mobile device of FIG. 1 to a selected one of the multiple electronic displays, in accordance with one or more embodiments; and FIGS. 8A and 8B (FIG. 8) is a flow chart illustrating a method for operating a multi-display multi-SIM mobile device in which a selected one of the multiple SIMs is user-assigned to a selected one of the multiple electronic displays, in accordance with one or more embodiments.

DETAILED DESCRIPTION

Figure 1:
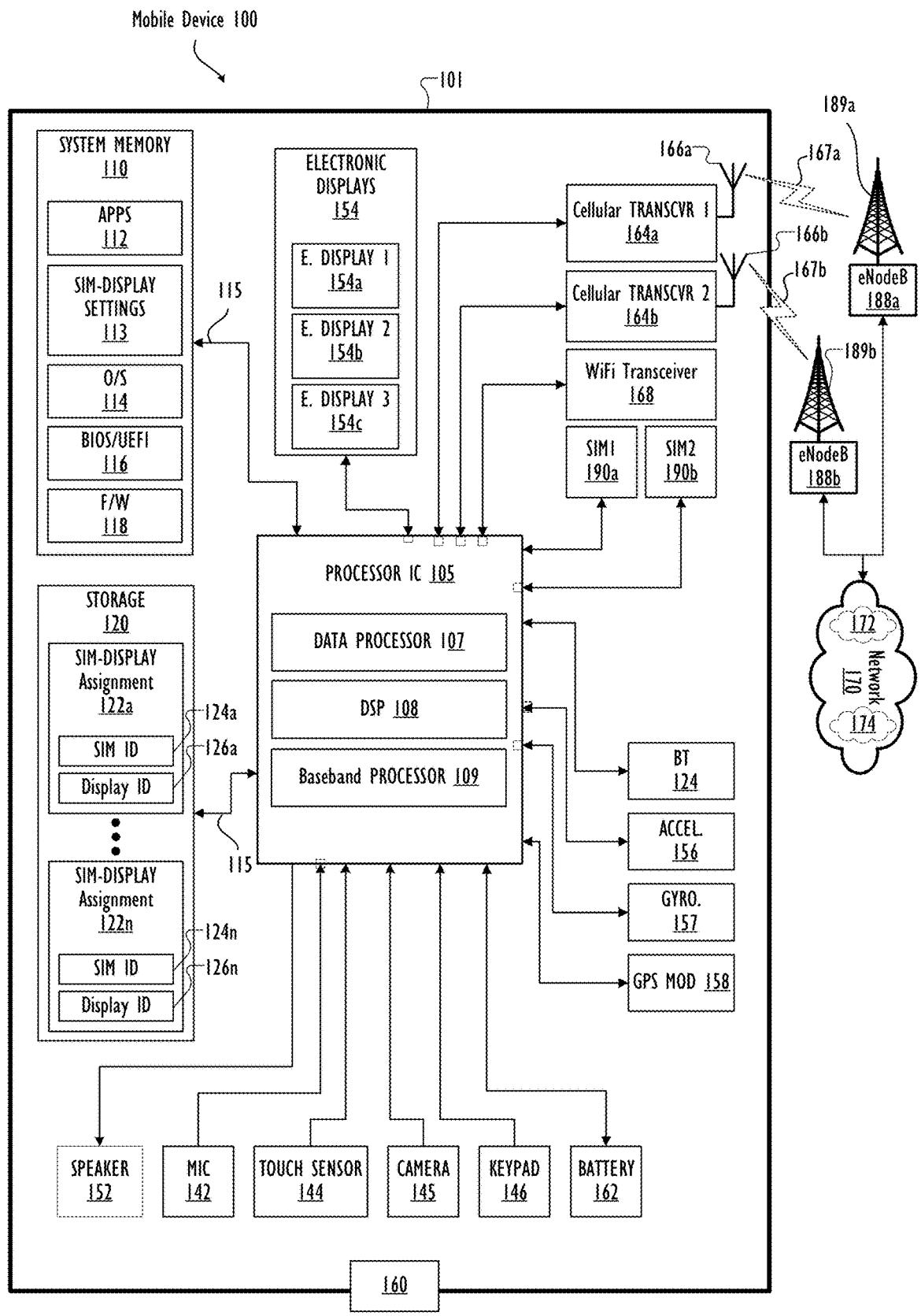
FIG. 1 is a block diagram representation of an example multi-display multi-SIM mobile device within which certain aspects of the disclosure can be practiced, in accordance with one or more embodiments of this disclosure.

The illustrative embodiments describe a method, a wireless communication device, and a computer program product for selectively channeling wireless telephony operations associated with a selected electronic display surface to a subscriber identification module (SIM) that is user-assigned to the selected electronic display surface.

The wireless communication device includes at least two SIMs, including a first SIM and a second SIM. The wireless communication device includes multiple electronic displays, including at least a first electronic display and a second electronic display. The wireless communication device includes a processor coupled to each of the at least two SIMs and the multiple electronic displays. The processor executes program code that enables the wireless communication device to: selectively channel data operations associated with a graphical user interface (GUI) of a currently active electronic display to one SIM that is user-assigned (i.e., assigned by the user of the device) to the currently active electronic display. The program code further enables the wireless communication device to: associate current input/output (I/O) functions with the currently active electronic display from among the multiple electronic displays.

According to another aspect of the disclosure, a method is provided within a wireless communication device having dual SIMs and multiple electronic display surfaces. The method includes selectively channeling data operations associated with a graphical user interface (GUI) of a currently active electronic display of the wireless communication device to one SIM that is user-assigned to the currently active electronic display. The method includes associating current input/output (I/O) functions with the currently active electronic display from among the multiple electronic displays.

According to one additional aspect of the disclosure, a computer program product is provided that includes a non-transitory computer readable storage device and program code on the computer readable storage device that when executed by a processor associated with an electronic device, the program code enables the electronic device to provide functionality according to the present disclosure. The computer program product code enables the electronic device to provide the functionality of: selectively channeling data operations associated with a graphical user interface (GUI) of a currently active electronic display of the electronic device to one SIM that is user-assigned to the currently active electronic display. The computer program product code also enables the electronic device to provide the functionality of: associating input/output (I/O) functions with the currently active electronic display from among the multiple electronic displays.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 2:
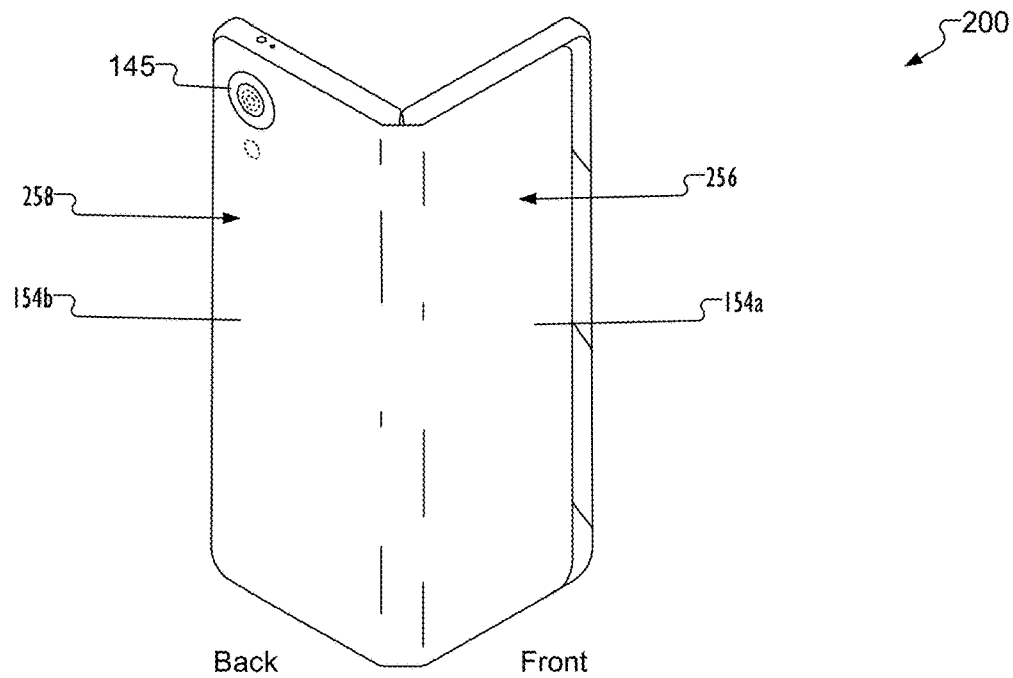
FIG. 2 illustrates an example foldable, dual-display three-dimensional structure of the mobile device of FIG. 1 within which certain aspects of the disclosure can be practiced, in accordance with one or more embodiments of this disclosure.
Figure 3:
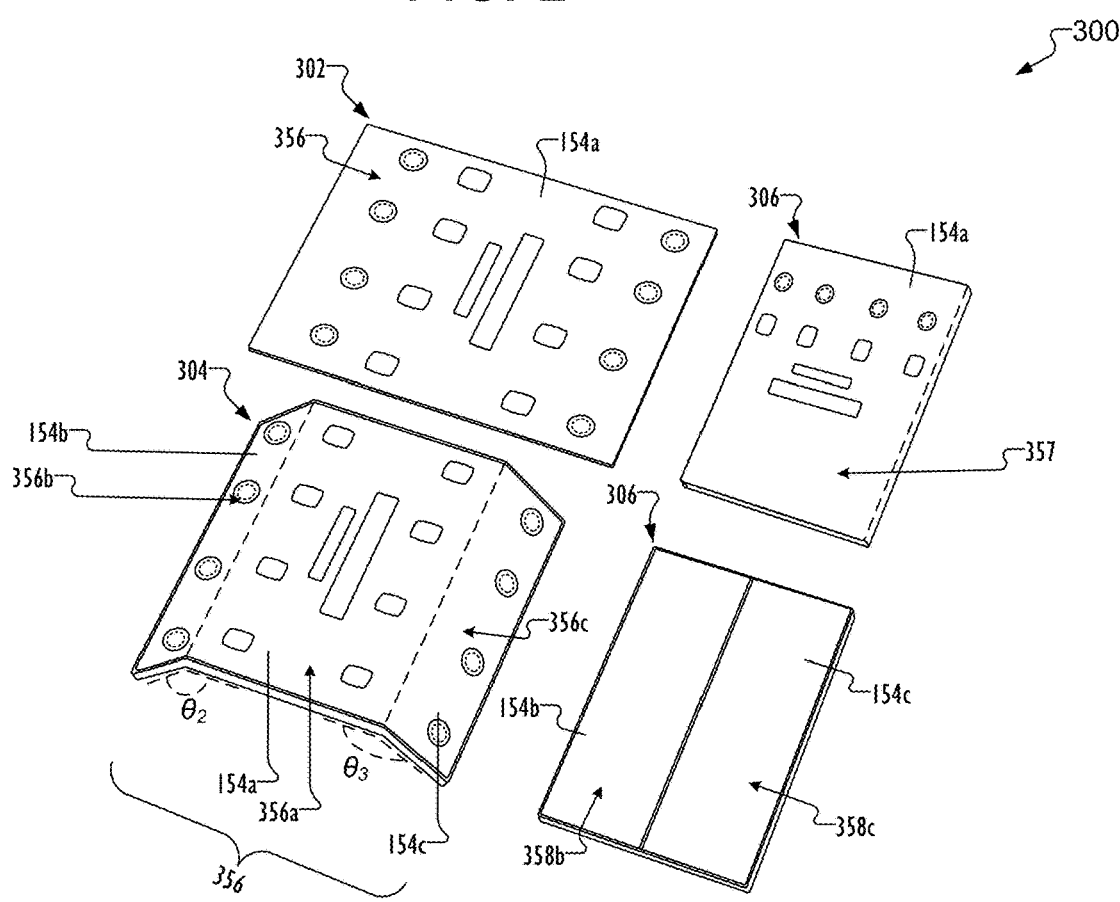
FIG. 3 illustrates an example multi-fold multi-display three-dimensional structure of the mobile device of FIG. 1 within which certain aspects of the disclosure can be practiced, in accordance with one or more embodiments of this disclosure.

FIG. 1 is a block diagram representation of an example multi-display multi-SIM mobile device 100, within which one or more of the described features of the various embodiments of the disclosure can be implemented. Mobile device 100 of FIG. 1 is depicted as a two-dimensional block diagram; however, it is understood that mobile device 100 is physically configured as a three-dimensional device, as illustrated by FIG. 2 or FIG. 3. The description of certain physical attributes of mobile device 100 will be described with reference to those components within FIG. 2 or FIG. 3. As shown by FIGS. 1-3, mobile device 100/200/300 includes functional compute components encased in an external casing (namely, housing 101) to form a dual-display mobile device 200 (FIG. 2) or to form a multi-fold mobile device 300 (FIG. 3). Mobile device 100 may be a smartphone, tablet, personal data assistant (PDA), a data processing system (DPS), a handheld device, personal computer, a server, or any other suitable electronic device, and may vary in size, shape, performance, functionality, and price.

Mobile device 100 includes at least one processor integrated circuit, processor IC 105. Included within processor IC 105 are data processor 107 and digital signal processor (DSP) 108. In some embodiments, processor IC 105 includes a baseband processor 109. In some embodiments, baseband processor 109 is an additional integrated circuit processor that is not included within processor IC 105. Processor IC 105 is coupled to system memory 110 and non-volatile storage 120 via a system communication mechanism, such as system interconnect 115. System interconnect 115 can be interchangeably referred to as a system bus, in one or more embodiments.

System memory 110 may be a combination of volatile and non-volatile memory, such as random access memory (RAM) and read-only memory (ROM). One or more software and/or firmware modules can be loaded into system memory 110 during operation of mobile device 100. As shown, system memory 110 can include therein a plurality of software and/or firmware modules including application(s) 112, settings such as SIM-to-Display Assignment settings 113 (illustrated as "SIM-DISPLAY SETTINGS"), operating system (O/S) 114, basic input/output system/unified extensible firmware interface (BIOS/UEFI) 116, and other firmware (F/W) 118. The various software and/or firmware modules have varying functionality when their corresponding program code is executed by processor IC 105 or other processing devices within mobile device 100.

In some embodiments, storage 120 can be a hard drive or a solid-state drive. The one or more software and/or firmware modules within storage 120 can be loaded into system memory 110 during operation of mobile device 100.

Processor IC 105 supports connection by and processing of signals from one or more connected input devices such as microphone 142, touch sensor 144, camera 145, keypad 146, and other sensors. Microphone(s) 142 detects sounds, including oral speech of a user(s), background noise, and other sounds, in the form of sound waves. In at least one embodiment, touch sensor 144 is a component of electronic display 154, enabling mobile device 100 to receive user tactile/touch input. Together, electronic display 154 and touch sensor 144 form a touchscreen electronic display that allows a user to provide input into mobile device 100 by touching features displayed on a display screen. Camera(s) 145 captures still and/or video image data, such as a video of the face of a user(s). Camera(s) 145 includes or is associated with facial recognition functionality that obtains facial recognition information and determines that the face of the user matches the face ID corresponding to a registered user. The face recognition information can indicate whether a person currently within view of camera 145 has facial features that match a previously registered face ID. The face recognition information can indicate which, if any of the multiple electronic displays 154 has a field of regard (FOR) directed towards a face of a registered user of the mobile device 100. It is understood that mobile device 100 can use various methods for determining whether an electronic display has a field of regard (FOR) directed towards a face of a registered user of the mobile device 100, and that this disclosure does not include an exhaustive list of such methods.

Processor IC 105 also supports connection by and processing of signals to one or more connected output devices, such as speaker 152 and each electronic display 154. More particularly, multi-display multi-SIM (MDMS) mobile device 100 includes at least two electronic displays 154, which are referred to collectively as multiple electronic displays 154, and a single one of which is generally referred to as electronic display 154 with a following letter a, b, etc. As an example, multiple electronic displays 154 includes first electronic display 154a, second electronic display, 154b, and third electronic display 154c. Electronic display 154 can be one of a wide variety of display devices, such as a liquid crystal display (LCD) or an organic light emitting diode (OLED) display.

Additionally, in one or more embodiments, one or more device interfaces 160, such as an optical reader, a universal serial bus (USB), a card reader, Personal Computer Memory Card International Association (PCMIA) slot, and/or a high-definition multimedia interface (HDMI), can be associated with mobile device 100. Mobile device 100 also contains a power source, such as battery 162, that supplies power to mobile device 100.

Mobile device 100 further includes Bluetooth transceiver (BT) 124, accelerometer (ACCEL.) 156, global positioning system module (GPS MOD) 158, and gyroscope 157, all of which are communicatively coupled to processor IC 105. Bluetooth transceiver 124 enables mobile device 100 and/or components within mobile device 100 to communicate and/or interface with other devices, services, and components that are located external to mobile device 100. Accelerometer 156 is utilized to measure non-gravitational acceleration and enables processor IC 105 to determine velocity and other measurements associated with the quantified physical movement of a user. Gyroscope 157 communicates the angular position of mobile device 100 using gravity to help determine orientation. GPS MOD 158 enables mobile device 100 to communicate and/or interface with other devices, services, and components to send and/or receive geographic position information.

Mobile device 100 is presented as a wireless communication device. As a wireless device, mobile device 100 can communicate and/or interface with other devices, services, and components that are located external (remote) to mobile device 100, via a communication network. These devices, services, and components can interface with mobile device 100 via an external network, such as example network 170, using one or more communication protocols. That is, mobile device 100 can transmit data over network 170. Network 170 can be a local area network, wide area network, personal area network, signal communication network, and the like, and the connection to and/or between network 170 and mobile device 100 can be wired or wireless or a combination thereof. For simplicity and ease of illustration, network 170 is indicated as a single block instead of a multitude of collective components. However, it is appreciated that network 170 can comprise one or more direct connections to other devices as well as a more complex set of interconnections as can exist within a wide area network, such as the Internet. For ease of explanation, it is understood that network 170 includes multiple carrier networks, including a first carrier network 172 and a second carrier network 174. First carrier network 172 is owned/operated by a first wireless service provider/operator, and similarly, second carrier network 174 is owned/operated by a second wireless service provider/operator. A carrier network can use 3GPP™ specifications (e.g., GSM, W-CDMA, LTE, and/or 5G) or non-3GPP™ specifications and protocols for communications.

Mobile device 100 includes at least one transceiver 164, including first cellular transceiver (Cellular TRANSCVR 1) 164a and second cellular transceiver (Cellular TRANSCVR 2) 164b. Each transceiver 164 is communicatively coupled to processor IC 105 and to a respective one of antennas 166a, 166b. Antennas 166a and 166b are referred generally referred to as simply antenna 166. Each transceiver 164 allows for wide-area or local wireless communication, via a respective wireless signal 167a, 167b (generally 167), between mobile device 100 and respective evolved node B (eNodeB) 188a, 188b (generally 188), which includes respective antenna 189a, 189b (generally 189). Mobile device 100 is capable of wide-area or local wireless communication with other mobile wireless devices. Mobile device 100 is capable of wireless communication with eNodeB 188 as a part of a wireless communication network.

Mobile device 100 communicates with other mobile wireless devices by utilizing a communication path involving transceiver 164, antenna 166, wireless signal 167, antenna 189, and eNodeB 188.

Mobile device 100 additionally includes wireless fidelity (WiFi) transceiver 168 that provides short-range communications with a WiFi access point that provides access to the Internet. In some embodiments, mobile device 100 additionally includes a near field communication transceiver, and a wireless power transfer receiver. In one embodiment, other devices within mobile device 100 utilize antenna 166 to send and/or receive signals in the form of radio waves. For example, GPS module 158 can be communicatively coupled to antenna 166 to send/and receive location data. Similarly, WiFi transceiver 168 can be communicatively coupled to antenna 166 to send/and receive data.

Mobile device 100 includes at least two subscriber identification modules, which are referred to collectively as SIMs 190, and a single one of which is generally referred to as SIM 190 with a following letter of the alphabet. More particularly, SIMs 190 includes first SIM (SIM1) 190a and second SIM (SIM2) 190b. First SIM 190a may include a controller and a memory that stores a first subscriber identity. For example, the first subscriber identity can be an International Mobile Subscriber Identity (IMSI) number assigned exclusively to first SIM 190a. The first subscriber identity, for example, may include a plurality of IMSIs, each of which is assigned exclusively to first SIM 190a. A wireless service provider that owns a carrier network (also referred to as a mobile radio communication network or core network) uses the IMSI number for identifying first SIM 190a. In at least one embodiment, the at least two SIMs 190a-190b include an e-SIM (also referred to as embedded Universal Integrated Circuit Card (eUICC)) that downloads configuration information from a wireless service provider and operates without a SIM card. In at least one embodiment, the at least two SIMs 190a-190b include an e-SIM that has machine-to-machine (M2M) and/or remote provisioning capabilities, which enable a user to switch to any service plans from any wireless service provider that offers eSIM support.

In some embodiments, mobile device 100 supports dual-SIM dual-standby (DSDS) functionality—meaning mobile device 100 allows inbound and outbound voice calls and SMS to be made and received from two subscriptions (i.e., SIM1 190a and SIM 2 190b), but only one subscription can be in a voice call at any given time. In a DSDS mobile device, a single cellular transceiver (e.g., first cellular transceiver 164a) includes a radio-frequency chain operably coupled to two SIMs (e.g., SIM1 190a and SIM 2 190b). In other embodiments, mobile device 100 supports dual-SIM dual-active (DSDA) functionality—meaning mobile device 100 allows inbound and outbound voice calls and SMS to be made and received from two subscriptions simultaneously. In a DSDA mobile device, each of two cellular transceivers (e.g., first and second cellular transceivers 164a-164b) includes a radio-frequency chain operably coupled to a respective one of two SIMs. In both DSDA mobile devices and DSDS mobile devices, only one SIM can be active for data communications at any given time. It is understood that embodiments according to the present disclosure can be implemented in both DSDS and DSDA mobile devices, unless expressly stated as being limited to a DSDS mobile device or expressly stated as being limited to a DSDA mobile device.

Similarly, second SIM 190b may include a controller and a memory that stores a second subscriber identity. For example, second subscriber identity can be one or a plurality of IMSI numbers assigned exclusively to second SIM 190b. A wireless service provider that owns a carrier network uses the IMSI number for identifying second SIM 190b.

As introduced above, mobile device 100 includes SIM-to-Display Assignment settings 113, which enables processor IC 105 to perform the method 700 (FIG. 7) of user-assigning a selected one of the multiple SIMs 190a-190b to a selected one of the multiple electronic displays. That is, SIM-to-Display Assignment settings 113 provides a user interface to a user of mobile device 100 that allows the user to input a selection of one SIM (from among the multiple SIMs 190a-190b) as a selected SIM, and to input a selection of at least one electronic display (from among the multiple electronic displays 154) for assigning to the selected SIM. SIM-to-Display Assignment settings 113 generates an assignment (illustrated as "SIM-Display Assignment") 122 that includes an identifier 124 of the selected SIM (SIM ID) linked to an identifier 126 of each selected electronic display (Display ID). Storage 120 stores a number (N) of assignments 122a-122n, each including a respective SIM ID 124a, 124n linked to a corresponding Display ID 126a, 126n. Additionally, SIM-to-Display Assignment settings 113 enables processor IC 105 to perform the method 800 (FIG. 8) of operating multi-display multi-SIM mobile device 100 in which a selected one of the multiple SIMs 190a-190b is user-assigned to a selected one of the multiple electronic displays 154. More particularly, during operation of mobile device 100, SIM-to-Display Assignment settings 113, enables processor IC 105 to selectively channel data operations associated with a selected electronic display surface to a specific SIM 190 that is user-assigned to the selected electronic display surface.

In an example scenario in which second SIM 190b is user-assigned to first electronic display 154a, then SIM-to-Display Assignment settings 113 enables the user of mobile device 100 to know that all cellular communications that occur in response to his/her user-interaction with a graphical user interface (GUI) displayed on first electronic display 154a will be channeled through second SIM 190b. In furtherance of this scenario, if first SIM 190a is associated with a personal account with a first wireless service provider, and if second SIM 190b is associated with a business account with a second wireless service provider, then SIM-to-Display Assignment settings 113 enables the user of mobile device 100 to know that the business account will be charged for all cellular communications that occur in response to his/her user-interaction with the GUI displayed on first electronic display 154a. Once second SIM 190b is user-assigned to first electronic display 154a, the user of mobile device 100 can use first electronic display 154a to initiate an outbound call operation or cellular data operation without the inconvenience of having to make an on-demand selection of a SIM and without the inconvenience of having to temporarily switch a default SIM setting.

In a scenario of multiple wireless service providers, first SIM 190a is associated with first carrier network 172 first eNodeB 188a, while second SIM 190b is associated with second carrier network 174 and second eNodeB 188b. That is, first SIM 190a communicates with first carrier network 172 by transmitting data to and receiving data from first eNodeB 188a via wireless signal 167a. Second SIM 190b communicates with second carrier network 174 by transmitting data to and receiving data from second eNodeB 188b via wireless signal 167b.

In a scenario of a single wireless service provider, first SIM 190a and second SIM 190a are associated with a single carrier network (e.g., first carrier network 172 or second carrier network 174). In one example, first SIM 190a and second SIM 190a both communicate with the same carrier network (e.g., first carrier network 172) by transmitting data to and receiving data from a single eNodeB (e.g., first eNodeB 188a or second eNodeB 188b). In another example, first SIM 190a and second SIM 190b both communicate with the same carrier network by transmitting data to and receiving data from different respective eNodeBs. That is, first SIM 190a communicates with first carrier network 172 by transmitting data to and receiving data from first eNodeB 188a via wireless signal 167a. Second SIM 190b communicates with first carrier network 172 by transmitting data to and receiving data from second eNodeB 188b via wireless signal 167b.

With reference now to FIG. 2, an example dual-display three-dimensional (3D) structure of mobile device 100 is presented. For differentiation purposes, mobile device 200 is referred to simply as dual-display mobile device 200. It is understood that components of mobile device 100 (FIG. 1) are included within dual-display mobile device 200. In the illustrated embodiment, the front of the body of dual-display mobile device 200 includes first electronic display 154a. Also, the back of the body of dual-display mobile device 200 includes second electronic display 154b. First electronic display 154a provides a primary display surface 256 (e.g., main display surface) on the front surface of dual-display mobile device 200, while second electronic display 154b provides a separate, auxiliary display surface 258 on the back surface of dual-display mobile device 200.

In at least one embodiment, dual-display mobile device 200 is foldable. In some embodiments, while dual-display mobile device 200 is folded, only one of the multiple electronic displays 154a-154b is active at any point in time, and the other electronic display is deactivated. For example, when a user of dual-display mobile device 200 looks at primary display surface 256 while dual-display mobile device 200 is folded, dual-display mobile device 200 detects (e.g., using camera 145 and/or gyroscope 157 of FIG. 1) that first electronic display 154a has a field of regard directed toward the face of the user. In response, first electronic display 154a displays an active GUI on primary display surface 256, and dual-display mobile device 200 deactivates second electronic display 154b. While deactivated, second electronic displays 154b does not output any light or display any features via auxiliary display surface 258. If the user flips the folded dual-display mobile device 200 over such that the user looks at auxiliary display surface 258, then the mobile device detects (e.g., using camera 145 and/or gyroscope 157 of FIG. 1) that second electronic display 154b has a field of regard directed toward the face of the user. In response, dual-display mobile device 200 deactivates first electronic display 154a, and second electronic display 154b is used to display a new active GUI on auxiliary display surface 258.

When dual-display mobile device 200 is unfolded, the mobile device activates the previously deactivated first or second electronic display such that both first and second electronic displays 154a-154b provide a combined area for displaying an active GUI. More particularly, auxiliary display surface 258 joins (i.e., merges; combines to form a single surface) the primary display surface 256 such that a combined display surface spans across both first and second electronic displays 154a-154b.

In another embodiment, dual-display mobile device 200 is not foldable. In such non-foldable embodiments, dual-display mobile device 200 cannot be unfolded, and auxiliary display surface 258 cannot be combined with primary display surface 256. Only one of the multiple electronic displays 154a-154b is active at any point in time, and the other electronic display is deactivated. More particularly, whichever electronic display 154a or 154b has a field of regard directed toward the face of the user is active and displays an active GUI on the respective, corresponding display surface 256 or 258.

With reference now to FIG. 3, there is illustrated multi-fold multi-display mobile device 300 which is an example of three-dimensional structure of mobile device 100 that is herein referred to simply as multi-fold mobile device 300. It is understood that components of mobile device 100 (FIG. 1) are included within multi-fold mobile device 300.

Multi-fold mobile device 300 includes three electronic displays, namely, first, second, and third electronic displays 154a, 154b, and 154c, respectively. Multi-fold mobile device 300 has can be folded and expanded into multiple different positions, including an expanded position 302, a tent position 304, and a folded position 306.

Multi-fold mobile device 300 has an expanded position 302 in which all three electronic displays 154a-154c are coplanar, forming a single (visibly contiguous) combined display surface 356 (e.g., main display surface). As utilized herein, combined display surface 356 generally refers to both the combined display in the expanded position 302 and the combined display in the tent position 304. Multi-fold mobile device 300 has a tent position in which first electronic display 154a is positioned horizontally flat, and each of second and third electronic displays 154b-154c positioned at respective obtuse angles (illustrated as $\theta_2$ and $\theta_3$) relative to first electronic display 154a.

In the embodiment shown in FIG. 3, in the tent position 304, all three of electronic displays 154a-154c collectively form a single, combined display surface 356. More particularly, in the tent position 304, second electronic display 154b displays a left portion 356b of the combined display surface 356, first electronic display 154a displays a center portion 356a of the combined display surface 356, and third electronic display 154c displays a right portion 356c of the combined display surface 356. In other embodiments, in the tent position, first electronic display 154a provides a primary display surface (not shown) that displays a first GUI, second electronic display 154b provides a first auxiliary surface (e.g., left auxiliary surface) that displays a second GUI, and third electronic display 154c provides a second auxiliary surface (e.g., right auxiliary surface) that displays a third GUI.

Multi-fold mobile device 300 has a folded position 306, shown in FIG. 3, in which first electronic display 154a is positioned horizontally flat and parallel relative to the second and third electronic displays 154b-154c. In the folded position 306, electronic display 154a forms the front of the body of multi-fold mobile device 300. That is, first electronic display 154a faces an opposite direction than the direction that second and third electronic displays 154b-154c face, when multi-fold mobile device 300 is in the folded position. In the folded position 306, first electronic display 154a provides a primary display surface 357 (e.g., main display surface) on the front of the body of multi-fold mobile device 300. Also, when multi-fold mobile device 300 is in the folded position 306, the back of the body of multi-fold mobile device 300 is bifurcated into two auxiliary display surfaces 358a-358b provided by second electronic display 154b on the left and a third electronic display 154c on the right. That is, in the folded position 306, second and third electronic displays 154b-154c are coplanar to each other, and substantially parallel to first electronic display 154a.

In some embodiments, at any point in time while multi-fold mobile device 300 is in the folded position 306, only the second and third electronic displays 154c-154b are active and first electronic display 154a is deactivated, or only first electronic display 154a is active and the second and third electronic displays 154c-154b are deactivated. For example, when a user of multi-fold mobile device 300 looks at primary display surface 357 while multi-fold mobile device 300 is in the folded position 306, mobile device 300 detects (e.g., using camera 145 and/or gyroscope 157 of FIG. 1) that first electronic display 154a has a field of regard directed toward the face of the user. In response, first electronic display 154a displays an active GUI on primary display surface 357, and mobile device 300 deactivates second and third electronic displays 154b-154c. While deactivated, second and third electronic displays 154b-154c do not output any light or display any features via auxiliary display surfaces 358b-358c. Similarly, if the user flips the mobile device 300 (while in the folded position 306) over such that the user looks at one of the auxiliary display surfaces (e.g., 358b or 358c), then mobile device 300 detects that second electronic display 154b has a field of regard directed toward the face of the user. In response, mobile device 300 deactivates first electronic display 154b, and second electronic display 154b displays a new active GUI on auxiliary display surface 358b.

When multi-fold mobile device 300 is unfolded into the expanded position 302, mobile device 300 activates the previously deactivated electronic display(s) such that all of the multiple electronic displays 154a-154c provide a combined area for displaying a single active GUI on combined display surface 356. More particularly, auxiliary display surfaces 358b-358c merge with the primary display surface 357 forming combined display surface 356, which spans across first, second, and third electronic displays 154a-154c.

FIGS. 4A-4F illustrate example SIM-to-Display settings menus for user-assigning a selected SIM of the mobile device of FIG. 1 to a selected electronic display, in accordance with one or more embodiments. An electronic display 154 separately displays each of the SIM-to-Display settings menus (FIGS. 4A-4F) as part of an active GUI.

With reference now to FIG. 4A, there is illustrated a first SIM-to-Display settings menu 400 for managing cellular communications and subscriptions associated with each of the multiple SIMs (i.e., SIM1 190a and SIM2 190b). For simplicity, first SIM-to-Display settings menu 400 will be referred to as simply first settings menu 400. First settings menu 400 includes a first menu item 402 for user-assigning at least one of the first and the second SIMs 190a-190b to a selected one of the multiple electronic displays 154. SIM-to-Display Assignment settings 113 generates an assignment 122 based on input that selects first menu item 402. In at least one embodiment, each new assignment 122 is initially generated with a null value as SIM ID 124 and a null value as Display ID 126, and later the assignment 122 is updated with identifiers of the selected SIM and selected electronic display. In at least one other embodiment, an identifier of the selected SIM as SIM ID 124 and an identifier of the selected electronic display as Display ID 126 are obtained and then used for initial generation of the new assignment 122.

First settings menu 400 includes a second menu item 404 for showing a default SIM setting to a user, for example, showing which of the multiple SIMs 190a-190b has been set as the default SIM. Processor 105 automatically determines whether the active GUI is user-assigned to (e.g., associated with) a SIM. More particularly, processor 105 automatically searches the assignments 122a-122n (FIGS. 1 and 5A-5C) for a display ID 126 that matches the display ID of the currently active electronic display. If the active GUI is not user-assigned to a SIM, then mobile device 100 automatically channels all data operations to the default SIM. When the active GUI is user-assigned to an active SIM, then mobile device 100 automatically channels all data operations to the user-assigned active SIM.

In response to receiving input selecting first menu item 402, electronic display 154 displays second SIM-to-Display settings menu 410 for selecting one of the multiple SIMs 190a-190b as a selected SIM. With reference now to FIG. 4B, there is illustrated second SIM-to-Display settings menu 410. For simplicity, second SIM-to-Display settings menu 410 will be referred to as simply second settings menu 410. Second settings menu 410 includes a third menu item 412 for receiving a selection of SIM1 190a as the selected SIM, and a fourth menu item 414 for receiving a selection of SIM2 190b as the selected SIM. If third menu item 412 is selected, SIM-to-Display Assignment settings 113 updates a SIM ID 124 corresponding to the generated assignment 122, by adding the identification of SIM1 190a to the generated assignment 122. If fourth menu item 414 is selected, SIM-to-Display Assignment settings 113 updates a SIM ID 124 corresponding to the generated assignment 122, by adding the identification of SIM2 190b to the generated assignment 122.

In response to receiving input selecting third menu item 412, electronic display 154 displays a third SIM-to-Display settings menu 420 for selecting at least one of the multiple electronic displays 154 for user-assigning to SIM1 190a, the selected SIM. With reference now to FIG. 4C, there is illustrated the third SIM-to-Display settings menu 420. For simplicity, third SIM-to-Display settings menu 420 will be referred to as third settings menu 420. In embodiments in which mobile device 100 is a dual-display mobile device (e.g., dual-display mobile device 200 of FIG. 2) with front and back electronic displays, third settings menu 420 includes fifth menu item 422 (illustrated as "Front Display") for receiving a selection of first electronic display 154a as the selected electronic display. Additionally, third settings menu 420 includes sixth menu item 424 (illustrated as "Back Display") for receiving a selection of second electronic display 154b as the selected electronic display. If fifth menu item 422 is selected, SIM-to-Display Assignment settings 113 updates a Display ID 126 corresponding to the generated assignment 122, by adding the identification of first electronic display 154a (e.g., front electronic display of FIG. 2) to the generated assignment 122. If sixth menu item 424 is selected, SIM-to-Display Assignment settings 113 updates a Display ID 126 corresponding to the generated assignment 122, by adding the identification of second electronic display 154b (e.g., back electronic display of FIG. 2) to the generated assignment 122.

With reference now to FIG. 4D, there is illustrated a fourth SIM-to-Display settings menu 430 for selecting at least one of the multiple electronic displays 154 for user-assigning to SIM2 190b, the selected SIM. For simplicity, fourth SIM-to-Display settings menu 430 will be referred to as fourth settings menu 430. Analogous to third settings menu 420 (FIG. 4C), fourth settings menu 430 includes seventh and eighth menu items 432 and 434 for receiving a selection of first and second electronic displays 154a and 154b, respectively, as the selected electronic display. SIM-to-Display Assignment settings 113 updates a Display ID 126 corresponding to the generated assignment 122, by adding the identification of first or second electronic display 154a or 154b (e.g., front or back electronic display of FIG. 2) to the generated assignment 122, based on whether seventh menu item 432 or eighth menu item 434 is selected, respectively.

In embodiments in which mobile device 100 is a multi-fold mobile device (e.g., multi-fold mobile device 300 of FIG. 3) with three electronic displays 154a-154c, in response to receiving input selecting third menu item 412, electronic display 154 displays a fifth SIM-to-Display settings menu 440 (FIG. 4E) for selecting at least one of the multiple electronic displays 154a-154c for user-assigning to SIM1 190a, the selected SIM. With reference now to FIG. 4E, there is illustrated fifth settings menu 440, which includes left display menu item 442 (illustrated as "Left Display") for receiving a selection of second electronic display 154b as the selected electronic display, a center display menu item 444 (illustrated as "Center Display") for receiving a selection of first electronic display 154a as the selected electronic display, and a right display menu item 446 (illustrated as "Right Display") for receiving a selection of third electronic display 154c as the selected electronic display. SIM-to-Display Assignment settings 113 updates Display ID 126 corresponding to the generated assignment 122, by adding the identification of first, second, or third electronic display 154a, 154b, or 154c (e.g., center, left, or right electronic display of FIG. 3) to the generated assignment 122, based on whether center display menu item 444, left display menu item 442, or right display menu item 446 is selected, respectively.

With reference now to FIG. 4F, there is illustrated a sixth SIM-to-Display settings menu 450 for selecting at least one of the multiple electronic displays 154a-154c for user-assigning to SIM2 190b, the selected SIM. For simplicity, sixth SIM-to-Display settings menu 450 will be referred to as sixth settings menu 430. Analogous to fifth settings menu 440 (FIG. 4E), sixth settings menu 450 includes left display menu item 452 (illustrated as "Left Display"), center display menu item 454 (illustrated as "Center Display"), and right display menu item 456 (illustrated as "Right Display") for receiving a selection of second, first, and third electronic displays 154b, 154a, and 154c, respectively, as the selected electronic display. SIM-to-Display Assignment settings 113 updates a Display ID 126 corresponding to the generated assignment 122, by adding the identification of the selected electronic display to the generated assignment 122, based on which menu item 452, 454, 456 is selected.

In at least one embodiment in which mobile device 100 is a foldable mobile device (200 or 300 of FIG. 2 or 3) with multiple electronic displays that provide respective display surfaces that are combinable into a single display surface, in response to receiving input selecting any menu item 412 or 414 on second SIM-to-Display settings menu 410, an electronic display 154 displays a SIM-to-Display settings menu for selecting at least one of the multiple display surfaces 256-258 (FIG. 2) or 356, 357, 358b-358c for user-assigning to SIM1 or SIM2 190a or 190b, respectively. Such embodiments enable a SIM to be user-assigned to a specific auxiliary display surface or to a primary display surface or to a combined display surface. A specific auxiliary display surface or a primary display surface may be composed from the hardware of one electronic display 154 when the mobile device is in the folded position, and may be merged into a combined display surface composed from the hardware of multiple electronic displays 154a-154c when the mobile device is unfolded to an expanded position. In this embodiment, SIM-to-Display Assignment settings 113 generates an assignment (122) that includes an identifier 124 of the selected SIM (SIM ID) linked to an identifier of each selected display surface. The identifier of a display surface can be different from or the same as the Display IDs 126 of the electronic displays from which the display surface is composed. Example identifiers of a display surface could be "Split Auxiliary Surface" for a single GUI that spans across multiple auxiliary display surfaces 358b and 358c provided by multiple electronic displays second and third electronic displays 154b and 154c (FIG. 3), "Left Auxiliary Surface" for auxiliary display surface 358b (FIG. 3), "Right Auxiliary Surface" for auxiliary display surface 358c (FIG. 3), "Main Surface" for primary display surface 357 (FIG. 3), or "Combined Main Surface" for combined display surface 356 (FIG. 3). Further, the SIM-to-Display settings menu for selecting at least one of the multiple display surfaces includes, for each of the multiple display surfaces, a menu item (labeled with a corresponding one of the identifiers of the display surfaces) for receiving a selection of one of display surface (e.g., 356) as the selected display surface.

Figure 5A:
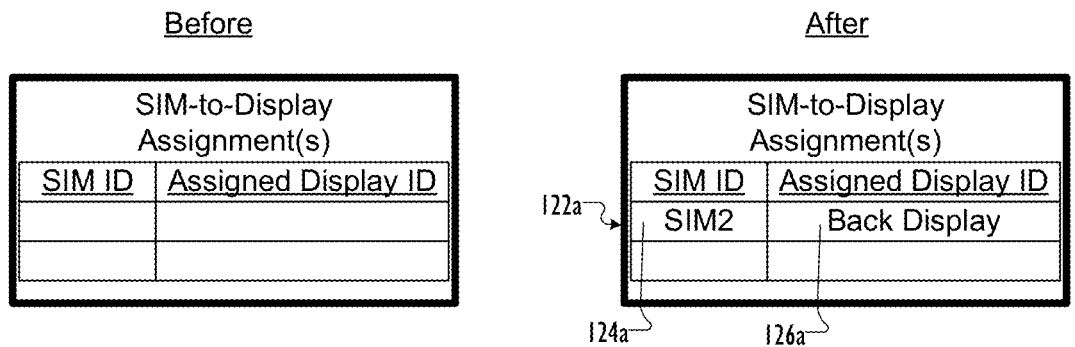
FIGS. 5A-5C illustrate three (3) before and after examples of user-assignment of a selected SIM of the mobile device of FIG. 1 to a selected electronic display, in accordance with one or more embodiments.
Figure 5B:
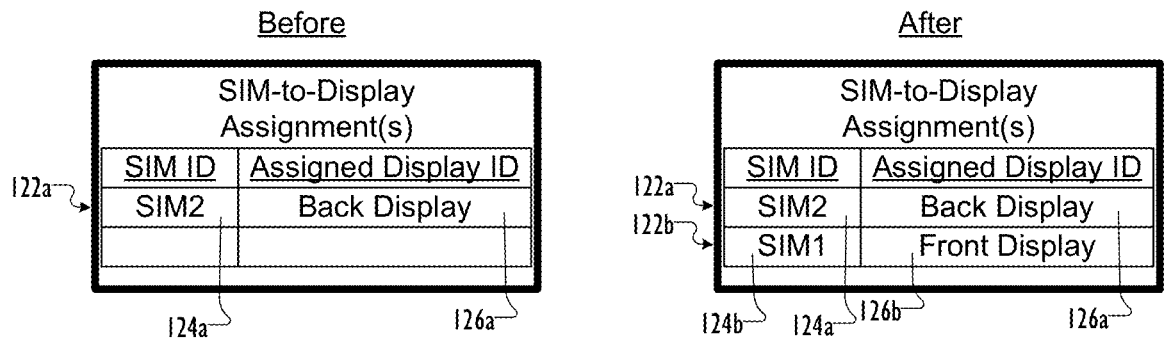
Figure 5C:
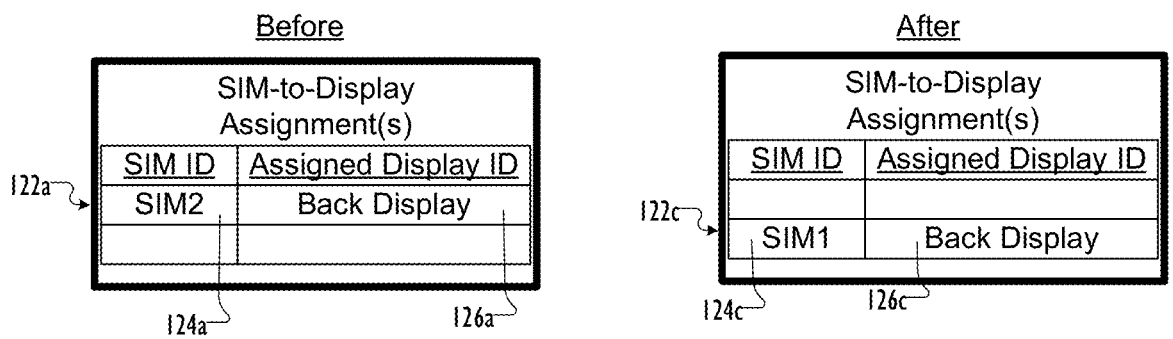

FIGS. 5A-5C each illustrates assignments 122 stored in storage 120 before and after a respective scenario in which a selected one of the multiple SIMs 190a-190b of dual-display mobile device 200 (FIG. 2) is user-assigned to a selected one of the multiple electronic displays 154a-154b, in accordance with one or more embodiments. In the examples shown in FIGS. 5A-5C, "Front Display" is the display ID corresponding to first electronic display 154a, and "Back Display" is the display ID corresponding to second electronic display 154b. Also, in the examples shown in FIGS. 5A-5C, "SIM1" is the SIM ID corresponding to SIM1 190a, and "SIM2" is the SIM ID corresponding to SIM2 190b.

Refer now to FIG. 5A. In a first scenario corresponding to FIG. 5A, before the user selects SIM2 190b and selects second electronic display 154b for assignment to each other, there are no assignments stored in storage 120. In order to user-assign SIM2 190b to second electronic display 154b, dual-display mobile device 200 receives a user input at first menu item 402 (labeled "Assign SIM to Display") in response to displaying first settings menu 400 (FIG. 4A). SIM-to-Display assignment settings 113 generates assignment 122a in storage 120 based on the received user input. Dual-display mobile device 200 receives a user input at fourth menu item 414 (labeled "SIM2") in response to displaying second settings menu 410 (FIG. 4B), and SIM-to-Display assignment settings 113 updates SIM ID 124a based on the received user input. That is, SIM-to-Display assignment settings 113 replaces the null value at SIM ID 124a with the SIM ID ("SIM2") corresponding to the selected second SIM 190b. Dual-display mobile device 200 receives a user input at eighth menu item 434 (labeled "Back Display") in response to displaying fourth settings menu 430 (FIG. 4D). SIM-to-Display assignment settings 113 updates Display ID 126a based on the received user input. That is, SIM-to-Display assignment settings 113 replaces the null value at Display ID 126a with the Display ID (i.e., "Back Display") corresponding to the selected second electronic display 154b. During subsequent operation of dual-display mobile device 200, SIM-to-Display Assignment settings 113 identifies assignment 122a, which enables processor IC 105 to selectively channel data operations associated with auxiliary display surface 258, provided by second electronic display 154b, to second SIM 190b. As well, during subsequent operation of dual-display mobile device 200, assignment 122a enables processor IC 105 to selectively channel uplink and downlink data operations and inbound and outbound voice/call operations associated with second SIM 190*b* to auxiliary display surface 258.

Refer now to FIG. 5B. In a second scenario corresponding to FIG. 5B, before the user selects SIM1 190*a* and selects first electronic display 154*a* for assignment to each other, there is one existing assignment 122*a* stored in storage 120. The existing assignment 122*a* was generated in the first scenario corresponding to FIG. 5A.

In order to user-assign SIM1 190*a* to first electronic display 154*a*, dual-display mobile device 200 receives a user input at first menu item 402 (labeled "Assign SIM to Display") in response to displaying first settings menu 400 (FIG. 4A). Dual-display mobile device 200 receives a user input at third menu item 412 (labeled "SIM1") in response to displaying second settings menu 410 (FIG. 4B). Dual-display mobile device 200 receives a user input at seventh menu item 432 (labeled "Front Display") in response to displaying fourth settings menu 430 (FIG. 4D).

Based on the received user inputs, SIM-to-Display assignment settings 113 generates another assignment 122*b* in storage 120, and replaces the null value at SIM ID 124*b* with the SIM ID ("SIM1") corresponding to the selected first SIM 190*a*, and replaces the null value at Display ID 126*b* with the Display ID (i.e., "Front Display") corresponding to the selected first electronic display 154*a*. During subsequent operation of dual-display mobile device 200, SIM-to-Display Assignment settings 113 identifies assignments 122*a* and 122*b*. Assignment 122*b* enables processor IC 105 to selectively channel data operations associated with primary display surface 256, provided by first electronic display 154*a*, to first SIM 190*a*. As well, assignment 122*b* enables processor IC 105 to selectively channel uplink and downlink data operations and inbound and outbound voice/call operations associated with first SIM 190*a* to primary display surface 256.

Refer now to FIG. 5C. In a third scenario corresponding to FIG. 5C, before the user selects SIM1 190*a* and selects second electronic display 154*b* for assignment to each other, there is one existing assignment 122*a* stored in storage 120. The existing assignment 122*a* was generated in the first scenario corresponding to FIG. 5A.

In order to user-assign SIM1 190*a* to first electronic display 154*a*, dual-display mobile device 200 receives a user input at first menu item 402 (labeled "Assign SIM to Display") on first settings menu 400 (FIG. 4A), receives a user input at third menu item 412 (labeled "SIM1") on second settings menu 410 (FIG. 4B), and receives a user input at menu item eighth 434 (labeled "Back Display") on fourth settings menu 430 (FIG. 4D).

SIM-to-Display assignment settings 113 determines that the selection of eighth menu item 434 (labeled "Back Display") corresponds to selecting second electronic display 154*b* that is currently already user-assigned to SIM2 190*b* according to the existing assignment 122*a*. In response to determining the selection of eighth menu item 434 selects an electronic display (154*b*) that is currently already user-assigned to another SIM (i.e., SIM2 190*b*), SIM-to-Display assignment settings 113 unassigns (e.g., revokes the assignment) the selected electronic display (154*b*) from the other SIM (i.e., SIM2 190*b*). In at least one embodiment, SIM-to-Display assignment settings 113 performs the un-assignment by updating the Display ID 126*a* currently assigned to the other SIM, namely, replacing the existing Display ID (i.e., "Back Display") with a null value. In at least one other embodiment, SIM-to-Display assignment settings 113 performs the un-assignment by deleting (e.g., removing) the existing assignment 122*a* that includes a matching Display ID (i.e., "Back Display"), as shown in FIG. 5C. In both embodiments, the un-assignment prevents SIM-to-Display assignment settings 113 from identifying assignment 122*a*, and enables processor IC 105 to cease from selectively channeling data operations associated with auxiliary display surface 258, provided by second electronic display 154*b*, to second SIM 190*b*.

Based on the received user inputs, SIM-to-Display assignment settings 113 generates another assignment 122*c* in storage 120, and replaces the null value at SIM ID 124*c* with the SIM ID ("SIM1") corresponding to the selected first SIM 190*a*, and replaces the null value at Display ID 126*c* with the Display ID (i.e., "Back Display") corresponding to the selected second electronic display 154*b*. During subsequent operation of dual-display mobile device 200, SIM-to-Display Assignment settings 113 identifies assignment 122*c*, which enables processor IC 105 to selectively channel data operations associated with auxiliary display surface 258, provided by second electronic display 154*b*, to first SIM 190*a*. As well, assignment 122*c* enables processor IC 105 to selectively channel uplink and downlink data operations and inbound and outbound voice/call operations associated with first SIM 190*a* to auxiliary display surface 258.

Figure 6B:
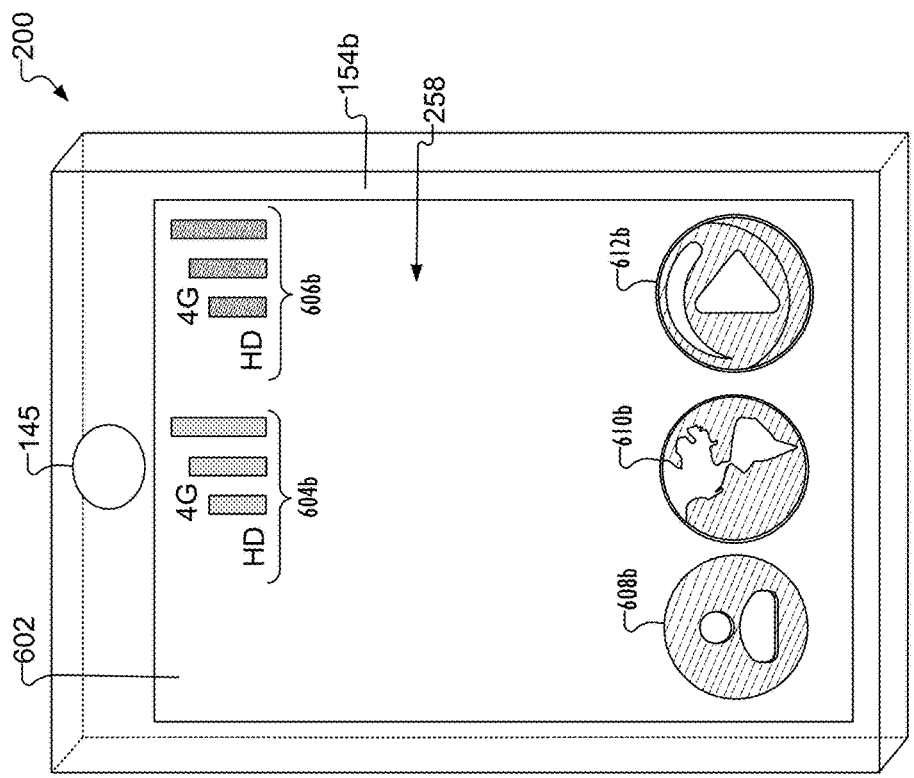
FIGS. 6A and 6B illustrates two example active graphical user interfaces (GUI), respectively displayed by two electronic displays positioned on the front and back of a multi-display multi-SIM mobile device, in accordance with one or more embodiments.
Figure 6A:
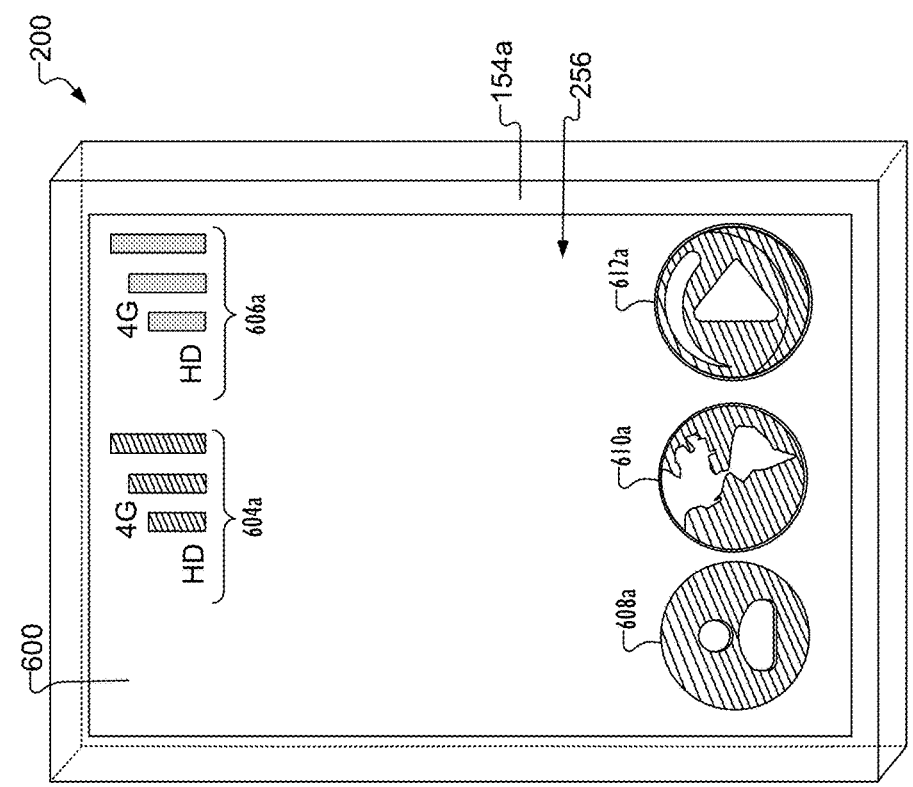

FIGS. 6A and 6B illustrates two example active graphical user interfaces (GUI), respectively displayed by two electronic displays positioned on the front and back of a multi-display multi-SIM mobile device 100/200/300, in accordance with one or more embodiments. In the example shown in FIGS. 6A and 6B, first SIM 190*a* is currently user-assigned to first electronic display 154*a*, as shown in assignment 122*b* (FIG. 5B), and second SIM 190*b* is currently user-assigned to second electronic display 154*b*, as shown in assignment 122*a* (FIG. 5B). FIG. 6A illustrates an active GUI 600 displayed on a primary display surface 256/357 that is provided by a first electronic display 154*a*. FIG. 6B illustrates another active GUI 602 displayed on an auxiliary display surface 258/358*b*/358*c* that is provided by a second electronic display 154*b*. In at least one embodiment, a single active GUI 602 is displayed across multiple auxiliary display surfaces 358*b* and 358*c* of a multi-fold mobile device 300 of FIG. 3. More particularly, in the folded position, second electronic display 154*b* can display a left portion of display GUI 602 via auxiliary display surface 358*b*. At the same time, third electronic display 154*c* can display a right portion of display GUI 602 via auxiliary display surface 358*c*. It is understood that that active GUIs 600-602 can be implemented by mobile device 100 (FIG. 1) in any suitable 3D structure. For example, multi-fold mobile device 300 of FIG. 3 can display active GUIs 600-602. For simplicity, FIGS. 6A and 6B are described as though the displaying of active GUIs 600-602 is implemented by dual-display mobile device 200 (FIG. 2).

As described above, processor 105 deactivates electronic displays that do not have a field of regard directed towards the face of a registered user of the mobile device. That is, an active GUI is only displayed by the currently active electronic display(s).

With reference now to FIG. 6A, dual-display mobile device 200 has determined that first electronic display 154*a* has a field of regard directed towards the face of a registered user of the mobile device, by using facial recognition functionality of camera 145. First electronic display 154*a* is currently active—meaning that a GUI and/or background application presented on first electronic display 154*a* is receiving and/or performing I/O functions (e.g., outputting light or displaying graphics). More particularly, first electronic display 154a receives inputs and provides outputs via primary display surface 256. Second electronic display 154b is deactivated due to not having a field of regard directed towards the face of a registered user of the mobile device.

SIM-to-Display Assignment settings 113 determines that first electronic display 154a (i.e., currently active electronic display) is currently user-assigned to first SIM 190a based on assignment 122a. In response to that determination, SIM-to-Display Assignment settings 113 associates operations on the display surface (256) provided by the currently active electronic display (154a) with the corresponding user-assigned SIM (190a). More particularly, in response to that determination, SIM-to-Display Assignment settings 113 associates the active GUI 600 displayed on the currently active display surface (256) with the corresponding user-assigned SIM (190a). In this disclosure, the SIM associated with the active GUI is referred to as the "active SIM." That is, SIM-to-Display Assignment settings 113 associate operations on the active GUI 600 with first SIM 190a as the active SIM. More particularly, processor 105 selectively channels data operations associated with the active GUI 600 to the active SIM (190a).

Active GUI 600 includes at least one status bar, including first status bar 604a. In some embodiments, active GUI 600 includes multiple status bars, including first status bar 604a and second status bar 606a. First status bar 604a represents the strength of a cellular signal associated with first SIM 190a, and second status bar 606a represents the strength of a cellular signal associated with second SIM 190b. In some embodiments, active GUI 600 includes multiple application icons 608a, 610a, 612a associated with respective mobile applications. For example, first, second, and third application icons 608a, 610a, and 612a can be associated with a social media mobile application, Internet browser mobile application, and video streaming mobile application, respectively.

SIM-to-Display Assignment settings 113 applies a different visual indicator to each status bar that is displayed on the currently active electronic display to indicate which SIM is the active SIM. Examples of visual indicators include color (e.g., achromatic color or chromatic color), hashing, blinking, non-blinking, and overlaid with a bubble. In the latter implementation, the bubble may be empty, or may include a number, letter, or symbol associated with the active SIM. On active GUI 600, SIM-to-Display Assignment settings 113 applies a first chromatic color (e.g., blue) to first status bar 604a to indicate that first SIM 190a is the active SIM.

In a first embodiment, the active GUI includes only one status bar. In this first embodiment, first status bar 604a is the only status bar displayed on GUI 600 (FIG. 6A). Second status bar 606b is the only one status bar displayed on GUI 602 (FIG. 6B). When GUI 600 (FIG. 6A) is the active GUI, SIM-to-Display Assignment settings 113 applies the first chromatic color (e.g., blue) to the first status bar 604a to indicate that first SIM 190a is the active SIM. When GUI 602 (FIG. 6B) is the active GUI, SIM-to-Display Assignment settings 113 applies a second chromatic color (e.g., orange) to the second status bar 604a to indicate that second SIM 190b is the active SIM. The first chromatic color is different from the second chromatic color.

In a first embodiment presented by FIGS. 6A and 6B, the active GUI includes multiple status bars, SIM-to-Display Assignment settings 113 applies different chromatic colors to indicate which SIM is the active SIM and applies an achromatic color to the respective status bar(s) associated with a non-active SIM. A first chromatic color (e.g., blue) indicates association with first SIM 190a, and a second chromatic color (e.g., orange) indicates association with second SIM 190b. The first chromatic color is different from the second chromatic color. Each of the chromatic colors (e.g., blue and orange) indicates association with the active SIM, but the achromatic color (e.g., gray) indicates association with the non-active SIM(s). More particularly, when GUI 600 (FIG. 6A) is the active GUI, SIM-to-Display Assignment settings 113 applies a first chromatic color (e.g., blue) to the first status bar 604a to indicate that first SIM 190a is the active SIM and applies an achromatic color (e.g., grey) to second status bar 606a to indicate that second SIM 190b is a non-active SIM. Also, when GUI 602 (FIG. 6B) is the active GUI, SIM-to-Display Assignment settings 113 applies a second chromatic color (e.g., orange) to the second status bar 606b to indicate that second SIM 190b is the active SIM and applies the achromatic color (e.g., grey) to first status bar 604b to indicate that first SIM 190a is a non-active SIM. In this first embodiment and in the second embodiment (described in the next paragraph), the active SIM is indicated by a visual indicator characterized by chromaticity, and the non-active SIM is indicated by a visual indicator characterized by achromaticity.

In a second embodiment, the active GUI includes multiple status bars, and SIM-to-Display Assignment settings 113 applies the first visual indicator to indicate which SIM is the active SIM. The same first visual indicator is applied to both GUIs 600 and 602, but is applied to a different status indicator, depending on which status bar is associated with the active SIM. More particularly, when GUI 600 (FIG. 6A) is the active GUI, SIM-to-Display Assignment settings 113 applies the first chromatic color (e.g., blue) to the first status bar 604a to indicate that first SIM 190a is the active SIM and applies an achromatic color (e.g., grey) to second status bar 606a to indicate that second SIM 190b is a non-active SIM. In an embodiment that includes three SIMS, SIM-to-Display Assignment settings 113 would apply the first chromatic color to first status bar 604a displayed on active GUI 600 and apply the achromatic color to the second and third status bars. When GUI 602 (FIG. 6B) is the active GUI, SIM-to-Display Assignment settings 113 applies the first chromatic color (e.g., blue) to the second status bar 606b to indicate that second SIM 190b is the active SIM and applies an achromatic color (e.g., grey) to first status bar 604b to indicate that first SIM 190a is a non-active SIM.

In a third embodiment, the active GUI includes only one status bar. In this first embodiment, first status bar 604a is the only status bar displayed on GUI 600 (FIG. 6A). Second status bar 606b is the only one status bar displayed on GUI 602 (FIG. 6B). When GUI 600 (FIG. 6A) is the active GUI, SIM-to-Display Assignment settings 113 applies the first chromatic color (e.g., blue) to the first status bar 604a to indicate that first SIM 190a is the active SIM. When GUI 602 (FIG. 6B) is the active GUI, SIM-to-Display Assignment settings 113 applies a second chromatic color (e.g., orange) to the second status bar 604a to indicate that second SIM 190b is the active SIM.

In the embodiment shown in FIG. 6A, all of application icons 608a-612a displayed on active GUI 600 are associated with first SIM 190a as the active SIM. More particularly, in response to detecting touch input on any one of the application icons 608a-612a displayed on active GUI 600, SIM-to-Display Assignment settings 113 channels data operations (i.e., uploading and downloading data) resulting from running the corresponding mobile application to the active SIM (190a). In at least one embodiment, outbound voice calls (e.g., corresponding to a voice call mobile app) initiated on active GUI 600 are channeled to the active SIM (190a).

The visual indicators that SIM-to-Display Assignment settings 113 applies to status bars can also be applied to each of the application icons based on the active/non-active status of the SIM with which the application icon is associated. More particularly, SIM-to-Display Assignment settings 113 applies a first visual indicator (e.g., first chromatic color of blue) to the application icons 608a-612a displayed on active GUI 600 (FIG. 6A) based on the active status of first SIM 190a. Similarly, when second SIM 190b becomes the active SIM, SIM-to-Display Assignment settings 113 applies a second visual indicator (e.g., second chromatic color of orange) to the application icons 608b, 610b, and 612b displayed on active GUI 602 (FIG. 6B) based on the active status of second SIM 190b.

With reference again to FIG. 6B, dual-display mobile device 200 has determined that second electronic display 154b has a field of regard directed towards the face of a registered user of the mobile device, by using facial recognition functionality of camera 145. Second electronic display 154b is currently active. More particularly, second electronic display 154b receives inputs and provides outputs via auxiliary display surface 258. First electronic display 154a is deactivated due to not having a field of regard directed towards the face of a registered user of the mobile device.

SIM-to-Display Assignment settings 113 determines that second electronic display 154b (i.e., currently active electronic display) is currently user-assigned to second SIM 190b based on assignment 122a. In response to that determination, SIM-to-Display Assignment settings 113 associates operations on the display surface (258) provided by the currently active electronic display (154b) with the corresponding user-assigned SIM (190b). More particularly, in response to that determination, SIM-to-Display Assignment settings 113 associates the active GUI 602 displayed on the currently active display surface (258) with the corresponding user-assigned SIM (190b). SIM-to-Display Assignment settings 113 associate operations on the active GUI 602 with second SIM 190b as the active SIM. More particularly, processor 105 selectively channels data operations associated with the active GUI 602 to the active SIM (190b).

Active GUI 602 includes at least one status bar, including second status bar 606b. In some embodiments, active GUI 602 includes multiple status bars, including first status bar 604b and second status bar 606b. First status bar 604b represents the strength of a cellular signal associated with first SIM 190a, and second status bar 606b represents the strength of a cellular signal associated with second SIM 190b. In some embodiments, active GUI 602 includes multiple application icons 608b, 610b, 612b associated with respective mobile applications. For example, first, second, and third application icons 608ba, 610b, and 612b can be associated with a social media mobile application, Internet browser mobile application, and video streaming mobile application, respectively. Some of the application icons displayed on active GUI 602 may be duplicates of application icons displayed on active GUI 600, but different visual indicators are or can be applied, as described above. In the embodiment shown in FIG. 6B, all of the application icons 608b-612b displayed on active GUI 602 are associated with second SIM 190b as the active SIM.

In at least one embodiment of mobile device 100, processor 105 throttles operations of mobile applications that are associated with a non-active SIM. For example, mobile applications may be running in the background prior to activating electronic display 154b to display active GUI 602. Some the background applications may have data operations channeled to first SIM 190a prior to activating electronic display 154b to display active GUI 602. When electronic display 154b activates and displays active GUI 602, second SIM 190b is the active SIM. Processor 105 throttles the background applications having data operations channeled to a non-active SIM (first SIM 190a). Examples of throttling include reducing bandwidth and/or transfer speed of data communications in order to limit the amount of data that can be transmitted/received at once. Another example of throttling includes terminating a data communication channel in order to stop all data communications channeled to a SIM that is not user-assigned to the active GUI 602 (second electronic display 154b). Another example of throttling includes reducing and/or limiting access to computer processing resources, such as processing by processor IC 105 and/or baseband processor 109. Some mobile applications running in the background have data operations channeled to the active SIM (second SIM 190b). In at least one embodiment, processor 105 throttles the background applications having data operations channeled to the active SIM (second SIM 190b). It is understood that throttling is not limited to scenarios in which second SIM 190b is the active SIM, and that throttling can be applied when the application of active/non-active SIM statuses change for the multiple SIMs 190a-190b.

Figure 7A:
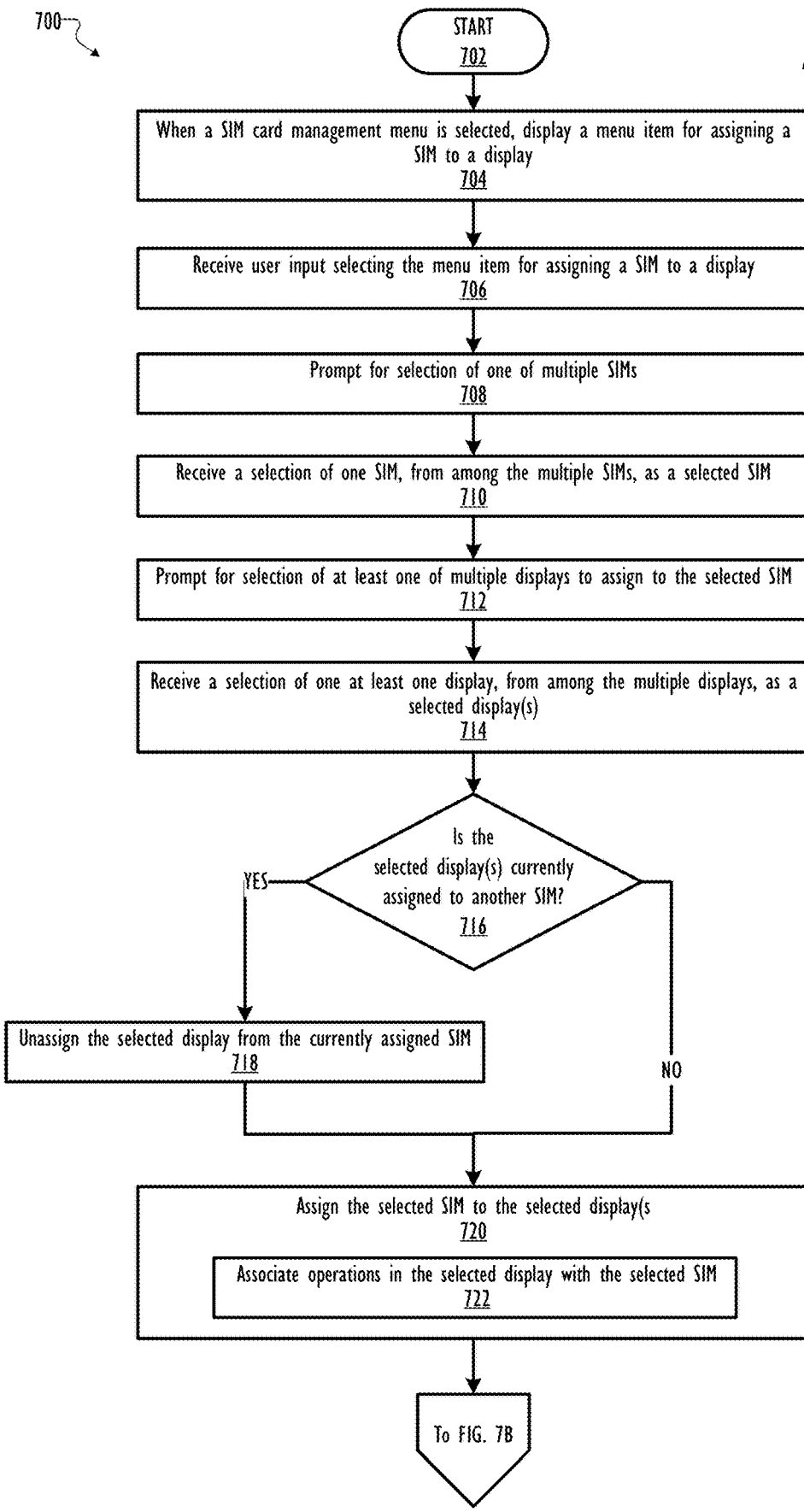
Figure 8A:
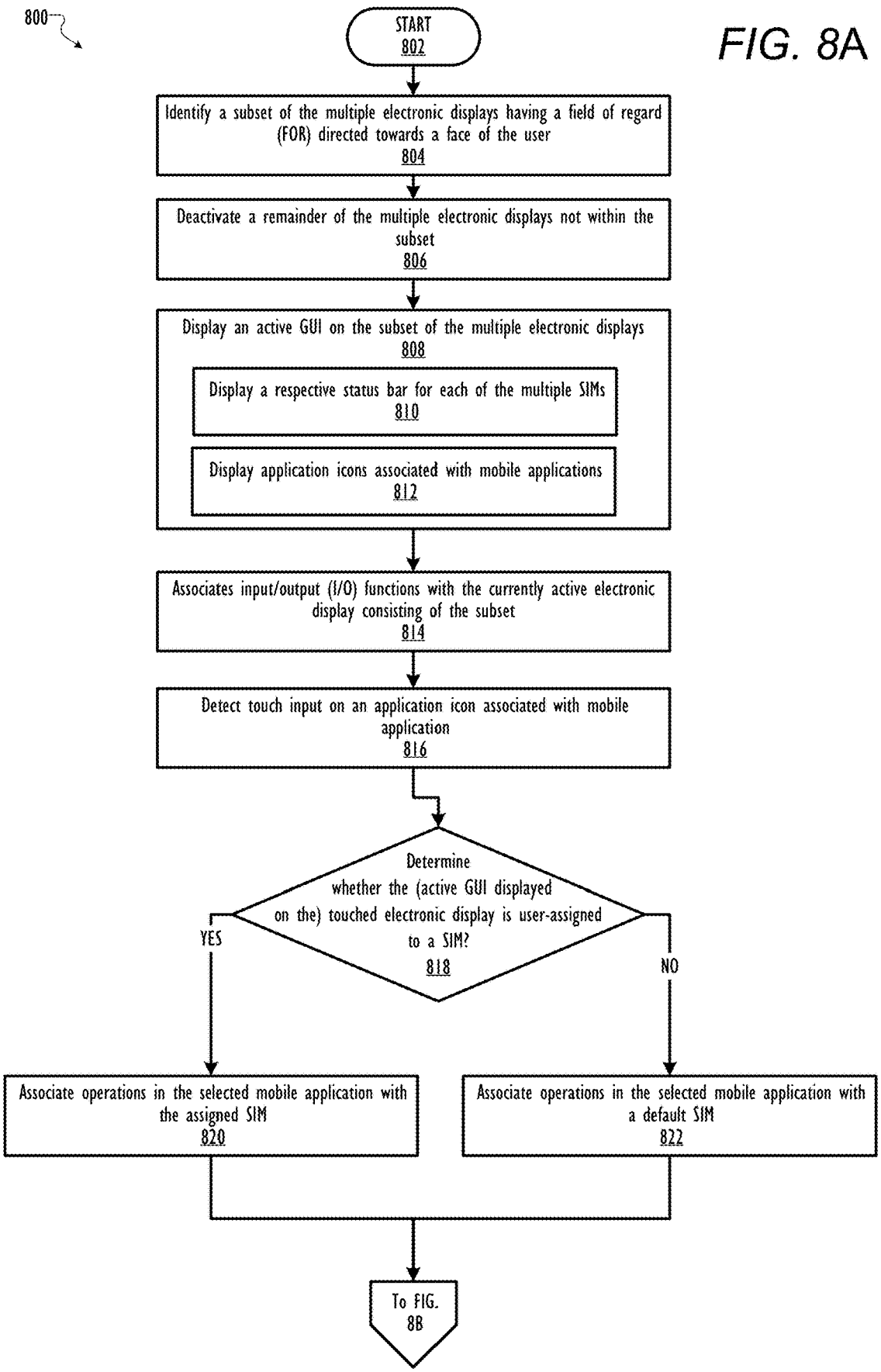

Referring now to the flow charts, FIG. 7 (FIGS. 7A and 7B) is a flow chart illustrating a method 700 for user-assigning a selected one of multiple SIMs 190a-190b of mobile device 100 of FIG. 1 to a selected one of multiple electronic displays 154a-154c, in accordance with one or more embodiments. FIG. 8 (FIGS. 8A and 8B) is a flow chart illustrating a method 800 for operating a multi-display, multi-SIM mobile device 100 (FIG. 1) in which a selected one of multiple SIMs 190a-190b is user-assigned to a selected one of multiple electronic displays 154a-154c, in accordance with one or more embodiments. The description of methods 700 and 800 will be described with reference to the components and examples of FIGS. 1-6B. The functions presented within methods 700 and 800 are achieved by processor execution of SIM-to-Display Assignment settings 113 within mobile device 100, or dual-display mobile device 200 (FIG. 2), or multi-fold mobile device 300 (FIG. 3), in accordance with one or more embodiments.

The operations illustrated in FIGS. 7 and 8 can be performed by mobile device 100/200/300 (FIGS. 1-3) or any suitable device, including one or more functional components of mobile device 100/200/300 that provide the described features. One or more of the processes of the methods described in FIGS. 7 and 8 may be performed by a processor (e.g., processor 105) executing program code associated with SIM-to-Display Assignment settings 113. The processes described in FIGS. 7 and 8 are generally described as being performed by processor 105 of mobile device 100 executing SIM-to-Display Assignment settings 113, which execution involves the use of other components of mobile device 100.

Now referring to FIG. 7 in which method 700 begins at the start block 702, then proceeds to block 704. At block 704, processor 105 displays a menu item (e.g., 402) for user-assigning a SIM to a display. More particularly, when SIM card management menu 400 is displayed, processor 105 displays first menu item 402 for user-assigning at least one of the first and the second SIMs 190a-190b to a selected one of the multiple electronic displays 154a-154c. At block 706, processor 105 receives user input selecting the first menu item 402 for assigning a SIM to a display.

At block 708, processor 105 prompts for a selection of one of the multiple SIMs 190a-190b. More particularly, as shown in FIG. 4B, processor 105 displays menu 410 for selecting one of the multiple SIMs 190a-190b as a selected SIM. At block 710, processor 105 receives user input selecting one of the multiple SIMs 190a-190b as a selected SIM. For example, as shown in FIG. 4B, processor 105 receives a touch input on either (i.e., a single one of) third menu item 412 or fourth menu item 414, which inputs a selection of either SIM1 190a or SIM2 190b, respectively, as the selected SIM.

At block 712, processor 105 prompts for a selection of at least one of multiple displays to assign to the selected SIM. More particularly, as shown in FIGS. 4C-4F, processor 105 displays a menu 420, 430, 440, 450 for selecting at least one of the multiple electronic displays for user-assigning to the selected SIM. The at least one selected electronic display includes fewer than all of the multiple electronic displays 154a-154c. At block 714, processor 105 receives user input selecting one or more of the multiple electronic displays 154a-154c as a selected display(s). For example, as shown in FIG. 4D, processor 105 may receive a touch input on eighth menu item 434 (labeled as "Back Display"), which inputs a selection of second electronic display 154b as the selected display. In this example, the touch input on eighth menu item 434 indicates a selection to user-assign second SIM 190b to second electronic display 154b.

At decision block 716, processor 105 determines whether the selected display(s) is currently assigned to another SIM, other than the selected SIM. In response to determining that the selected display(s) is not currently assigned to another SIM, method 700 proceeds to block 720. In response to determining that the selected display(s) is currently assigned to another SIM, method 700 proceeds to block 718.

At block 718, processor 105 unassigns the selected display(s) from the currently assigned SIM. For example, the before and after assignments of FIG. 5C show an example of processor 105 unassigning the selected Back Display (second electronic display 154b) from the currently assigned SIM2 (second SIM 190b).

At block 720, processor 105 user-assigns the selected SIM to the selected display(s). More particularly, processor 105 user-assigns the selected SIM to the selected display(s) by generating an assignment 122 that includes an identifier 124 of the selected SIM (SIM ID) linked to an identifier 126 of each selected electronic display (Display ID). In at least one embodiment, by user-assigning the selected SIM to the selected display(s), processor 105 associates (sub-block 722) operations (e.g., I/O functions and/or data operations and/or cellular communication) in the selected display(s) with the selected SIM. For example, as shown in FIG. 6A, I/O functions of the active GUI 600, primary display surface 256, and first electronic display 154a, are associated with the corresponding active SIM (i.e., first SIM 190a).

In at least one embodiment of block 720, processor 105 user-assigns the selected SIM to multiple selected electronic displays. Processor 105 can generate a corresponding assignment 122 including a Display ID that represents multiple selected electronic displays. Processor 105 can generate a corresponding assignment 122 including multiple Display IDs, with each Display ID representing a respective one of the multiple selected electronic displays. In a similar embodiment of block 720, processor 105 user-assigns the selected SIM to multiple selected display surfaces. Processor 105 can generate a corresponding assignment 122 including a Display ID that represents multiple selected display surfaces or including multiple Display IDs representing a respective one of the multiple selected display surfaces. As an example, the corresponding assignment 122 can include an identifier 124 of second SIM 190b linked to identifiers of multiple auxiliary display surfaces (e.g., "Left Auxiliary Surface" and "Size-Reduced Main Surface" for auxiliary display surface 358b and primary display surface 357 of FIG. 3). In this example, when second SIM 190b is the active SIM, I/O functions of an active GUI displayed on auxiliary display surface 358b are associated with second SIM 190b, the corresponding active SIM. In this example, when second SIM 190b is the active SIM, I/O functions of an active GUI displayed on primary display surface 357 are associated with second SIM 190b, the corresponding active SIM.

Now refer to FIG. 7B. At block 724, on each of the multiple electronic displays 154a-154c, processor 105 applies a different visual indicator to each status bar that is displayed on the currently active electronic display to indicate which SIM is the active SIM and which status bar is associated with the active SIM. At block 726, processor 105 applies a visual indicator to at least one application icon displayed on the currently active electronic display to visually indicate which of the at least two SIMs is the active SIM. More particularly, on each of the multiple electronic displays 154a-154c, processor 105 applies a different visual indicator to application icons that are displayed on the currently active electronic display to indicate which SIM is the active SIM and/or that I/O functions of mobile applications represented by the application icons are associated with the active SIM. At block 728, on each of the multiple electronic displays 154a-154c, processor 105 applies a different visual indicator to status bars associated with a non-active SIM that is not assigned to the electronic display currently displaying the active screen. The different visual indicator indicates the status bars are associated with a non-active SIM. For example, as shown in FIG. 6A, processor 105 applies a visual indicator (i.e., first chromatic color of blue) to first status bar 604a and application icons 608a, 610a, and 612a, which are associated with the active SIM (second SIM 190b), and processor 105 applies a different visual indicator (i.e., achromatic color of gray) to second status bar 606a associated with a non-active SIM. Also, as shown in FIG. 6B, processor 105 applies a visual indicator (i.e., second chromatic color of orange) to second status bar 606b and application icons 608b, 610b, and 612b, which are associated with the active SIM (second SIM 190b), and processor 105 applies a different visual indicator (i.e., achromatic color of gray) to first status bar 604b associated with a non-active SIM. The method 700 concludes at the end block 730.

Now referring to FIG. 8 in which method 800 begins at the start block 802, then proceeds to block 804. At block 804, processor 105 identifies a subset of the multiple electronic displays 154a-154c having a field of regard directed towards a face of a user. As an example, in multi-fold mobile device 300, processor 105 may determine that that second electronic display 154b has a field of regard directed towards a face of a user. Based on this determination, processor 105 and may identify that the subset of the multiple electronic displays displaying the active GUI consists of second electronic display 154b. At block 806, processor 105 deactivates a remainder of the multiple electronic displays not within the subset.

At block 808, processor 105 displays an active GUI on the subset of the multiple electronic displays. The currently active electronic display comprises each electronic display within the subset of the multiple electronic displays having a field of regard directed towards a face of a user. In at least one embodiment, displaying an active GUI on the subset of the multiple electronic displays (block 808) further comprises displaying, on the active GUI, a respective status bar for each of the multiple SIMs (sub-block 810). In at least one embodiment, displaying an active GUI on the subset of the multiple electronic displays (block 808) further comprises displaying (sub-block 812), on the active GUI, application icons associated with mobile applications.

At block 814, processor 105 associates input/output (I/O) functions with the currently active electronic display from among the multiple electronic displays. More particularly, processor 105 associates input/output (I/O) functions with the subset of the multiple electronic displays having a field of regard (FOR) directed towards a face of the user.

At block 816, processor 105 detects touch input on the active GUI of an application icon associated with a mobile application. More particularly, in response to the touch input on the application icon, processor 105 runs (e.g., launches or executes program code of) the associated mobile application. As an example, the touch input on the active GUI may be received by a touch sensor 144 corresponding to second electronic display 154b.

At decision block 818, processor 105 determines whether the active GUI displayed on the touched electronic display is user-assigned to a SIM. In at least one embodiment, processor 105 makes the determination at block 816 by determining which, if any, of the multiple SIMs 154a-154c is user-assigned to the subset of the multiple electronic displays displaying the active GUI. As an example, processor 105 may determine that an active GUI displayed on auxiliary display surfaces 358b is user-assigned to second SIM 190b, based on an identification of an assignment 122 (including SIM2 linked to Left Display). In response to a determination that at least one of the multiple SIMs 190a-190b is an active SIM that is user-assigned to the subset (e.g., second electronic display 154b) of the multiple electronic displays displaying the active GUI, processor 105 associates (at block 820) operations initiated on the active GUI with the active SIM. In response to a determination that none of the multiple SIMs 190a-190b is user-assigned to the subset (e.g., second electronic display 154b) of the multiple electronic displays displaying the active GUI, processor 105 associates (at block 822) operations initiated on the active GUI with the default SIM.

At block 824, processor 105 selectively channels data operations associated with a GUI of a currently active electronic display to one of the SIM that is user-assigned to the currently active electronic display or the default SIM, based on the determination of whether the active GUI is user-assigned to a SIM.

At block 826, processor 105 throttles operations of mobile applications that are associated with a non-active SIM. At block 828, processor 105 detects reorientation of the mobile device such that at least one electronic display, among the remainder of the multiple electronic displays not within the subset, has a field of regard (FOR) directed toward the face of the user.

At block 830, in response to identifying the face of the user within the field of regard of the at least one electronic display, among the remainder of the multiple electronic displays not within the subset, processor 105 deactivates at least one feature of the subset of the multiple electronic displays and enables the at least one electronic display among the remainder of the multiple electronic displays to display a new active GUI corresponding to the SIM that is assigned to the at least one electronic display among the remainder of the multiple electronic displays.

At block 832, in response to detecting opening of a foldable mobile device to expand a currently displayed active GUI to the multiple electronic displays, processor 105 extends the active GUI to display across all of the multiple electronic displays. Processor 105 also associates user inputs received on any portion of the multiple electronic displays with functions associated with the SIM that is user-assigned to the currently-displayed active GUI. When no SIM is user-assigned to the currently-displayed active GUI, processor 105 also associates user inputs received on any portion of the multiple electronic displays with functions associated with the default SIM. The method 800 concludes at the end block 834.

In the above-described flowcharts of FIGS. 7 and 8, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A wireless communication device comprising:
   at least two subscriber identification modules (SIMs), including a first SIM and a second SIM;
   multiple electronic displays, including at least a first electronic display and a second electronic display;
   a processor coupled to each of the at least two SIMS and the multiple electronic displays, and which executes program code that enables the wireless communication device to:
      receive user input that comprises (i) selecting one of the at least two SIMS as a selected SIM and (ii) selecting at least one of the multiple electronic displays for user-assigning to the selected SIM, the at least one selected electronic display including fewer than all of the multiple electronic displays; and
      in response to receiving the user input, user-assign the selected SIM to the at least one selected electronic display such that application and data operations initiated using any of the at least one selected electronic display are associated with the selected SIM and not with another one of the at least two SIMS that is not selected;
      selectively channel data operations associated with a graphical user interface (GUI) of a currently active electronic display to one SIM that is user-assigned to the currently active electronic display; and
      associate current input/output (I/O) functions with the currently active electronic display from among the multiple electronic displays and with the selected SIM.

2. The wireless communication device of claim 1, the program code further enabling the wireless communication device to:
   display a menu item for user-assigning at least one of the first and the second SIMS to a selected one of the first and the second electronic displays; and
   receive the user input via the menu item.

3. The wireless communication device of claim 2, wherein the program code further enables the device to:
   prior to user-assigning the selected SIM to the at least one selected electronic display:
      determine whether any electronic display among the at least one selected electronic display is currently user-assigned to another SIM;
      in response to determining an electronic display among the at least one selected electronic display is currently user-assigned to another SIM, unassign the at least one selected electronic display from the other SIM.

4. The wireless communication device of claim 2, wherein the program code further enables the device to:
   identify a subset of the multiple electronic displays having a field of regard directed towards a face of a user;
   deactivate a remainder of the multiple electronic displays not within the subset;
   display an active GUI on the subset of the multiple electronic displays, the currently active electronic display comprising each electronic display within the subset of the multiple electronic displays;
   determine which, if any, of the multiple SIMS is user-assigned to the subset of the multiple electronic displays displaying the active GUI; and
   in response to determining at least one of the multiple SIMS is an active SIM that is user-assigned to the subset of the multiple electronic displays displaying the active GUI, associate operations initiated on the active GUI with the active SIM.

5. The wireless communication device of claim 4, wherein:
   the active GUI is a GUI being displayed on the first electronic display; and
   the program code further enables the device to:
      deactivate at least one feature on the second electronic display while the first electronic display is being used to present the active GUI;
      detect reorientation of the device such that a field of regard (FOR) of the second electronic display is directed toward a face of a user; and
      in response to identifying the face of the user within the FOR of the second electronic display, deactivating at least one feature of the first electronic display and enabling the second electronic display to display a new active GUI corresponding to the SIM that is assigned to the second electronic display.

6. The wireless communication device of claim 1, wherein:
the wireless communication device is foldable such that when the wireless communication device is folded, the multiple electronic displays comprises a main display surface and at least one auxiliary display surface, and when the wireless communication device is unfolded, the at least one auxiliary display surface of the multiple electronic displays joins the main display surface; and
the program code further enables the device to:
in response to detecting opening of the foldable device to expand a currently displayed active GUI to the multiple electronic displays: extend the active GUI to display across all of the multiple electronic displays jointly providing the main display surface; and associate user inputs received on any portion of the multiple electronic displays with functions associated with the SIM user-assigned to the currently displayed active GUI.

7. The wireless communication device of claim 1, wherein the program code further enables the device to:
apply a visual indicator to at least one application icon displayed on the currently active electronic display to visually indicate, based on the visual indicated that is applied to the at least one application icon, which of the at least two SIMs is the active SIM, each of the at least one application icon associated with a respective mobile application.

8. The wireless communication device of claim 1, wherein the program code further enables the device to:
display, on the currently active electronic display, a respective status bar for each of the multiple SIMS;
apply a different visual indicator to each status bar that is displayed on the currently active electronic display to indicate which SIM is the active SIM and which status bar is associated with the active SIM.

9. The wireless communication device of claim 8, wherein the program code further enables the device to:
display, on the currently active electronic display, a respective status bar for each of the multiple SIMS;
apply a different visual indicator to each status bar that is concurrently displayed on the currently active electronic display to indicate which SIM is the active SIM and which status bar is associated with the active SIM by:
in response to displaying the active GUI on an electronic display that is user-assigned to the active SIM, apply a first visual indicator to the status bar associated with the active SIM;
in response to displaying the active GUI on an electronic display that is user-assigned to a second SIM, apply a second visual indicator to status bars associated with the second SIM; and
apply a third visual indicator to each status bar associated with an inactive SIM that is not user-assigned to the active GUI.

10. A method comprising:
receiving user input that comprises (i) selecting one of at least two SIMS as a selected SIM and (ii) selecting at least one of multiple electronic displays for user-assigning to the selected SIM, the at least one selected electronic display including fewer than all of the multiple electronic displays;
in response to receiving the user input, user-assigning the selected SIM to the at least one selected electronic display such that application and data operations initiated using any of the at least one selected electronic display are associated with the selected SIM and not with another one of the at least two SIMS that is not selected;
selectively channeling data operations associated with a graphical user interface (GUI) of a currently active electronic display of a wireless communication device to one SIM that is user-assigned to the currently active electronic display, the wireless communication device comprising:
the at least two SIMS, including a first SIM and a second SIM;
multiple electronic displays, including at least a first electronic display and a second electronic display; and
a processor coupled to each of the at least two SIMS and the multiple electronic displays; and
associating current input/output (I/O) functions with the currently active electronic display from among the multiple electronic displays and with the selected SIM.

11. The method of claim 10, further comprising:
displaying a menu item for user-assigning at least one of the first and the second SIMS to a selected one of the first and the second electronic displays; and
receiving the user input via the menu item.

12. The method of claim 11, further comprising:
identifying a subset of the multiple electronic displays having a field of regard directed towards a face of a user;
deactivating a remainder of the multiple electronic displays not within the subset;
displaying an active GUI on the subset of the multiple electronic displays, the currently active electronic display comprising each electronic display within the subset of the multiple electronic displays;
determining which, if any, of the multiple SIMS is currently user-assigned to the subset of the multiple electronic displays displaying the active GUI; and
in response to determining at least one of the multiple SIMS is an active SIM that is user-assigned to the subset of the multiple electronic displays displaying the active GUI, associating operations initiated on the active GUI with the active SIM.

13. The method of claim 12, wherein:
the active GUI is a GUI being displayed on the first electronic display; and
the method further comprises:
deactivating at least one feature on the second electronic display while the first electronic display is being used to present the active GUI;
detecting reorientation of the device such that a field of regard (FOR) of the second electronic display is directed toward a face of a user; and
in response to identifying the face of the user within the FOR of the second electronic display, deactivating at least one feature of the first electronic display and enabling the second electronic display to display a new active GUI corresponding to the SIM that is assigned to the second electronic display.

14. The method of claim 10, further comprising:
displaying, on the currently active electronic display, a respective status bar for each of the multiple SIMS; and
applying a different visual indicator to each status bar that is displayed on the currently active electronic display to indicate which SIM is the active SIM and which status bar is associated with the active SIM.

15. The method of claim 14, wherein applying the different visual indicator to each status bar displayed on the currently active electronic display further comprises:
in response to displaying the active GUI on an electronic display that is user-assigned to the active SIM, applying a first visual indicator to the status bar associated with the active SIM;
in response to displaying the active GUI on an electronic display that is user-assigned to a second SIM, applying a second visual indicator to status bars associated with the second SIM; and
applying a third visual indicator to each status bar associated with an inactive SIM that is not user-assigned to the active GUI.

16. A computer program product comprising:
a non-transitory computer readable storage device;
program code on the computer readable storage device that when executed by a processor associated with an electronic device, the program code enables the electronic device to provide the functionality of:
receiving user input that comprises (i) selecting one of at least two SIMS as a selected SIM and (ii) selecting at least one of multiple electronic displays for user-assigning to the selected SIM, the at least one selected electronic display including fewer than all of the multiple electronic displays;
in response to receiving the user input, user-assigning the selected SIM to the at least one selected electronic display such that application and data operations initiated using any of the at least one selected electronic display are associated with the selected SIM and not with another one of the at least two SIMS that is not selected;
selectively channeling data operations associated with a graphical user interface (GUI) of a currently active electronic display of the electronic device to one SIM that is user-assigned to the currently active electronic display, the electronic device comprising:
the at least two SIMS, including a first SIM and a second SIM;
multiple electronic displays including at least a first electronic display and a second electronic display; and
a processor coupled to each of the at least two SIMS and the multiple electronic displays; and
associating current input/output (I/O) functions with the currently active electronic display from among the multiple electronic displays and with the selected SIM.

17. The computer program product of claim 16, wherein the program code comprises program code that, when executed by the processor, enables the electronic device to provide the functionality of:
displaying a menu item for user-assigning at least one of the first and the second SIMS to a selected one of the first and the second electronic displays; and
receiving the user input via the menu item.

18. The computer program product of claim 17, wherein the program code comprises program code that, when executed by the processor, enables the electronic device to provide the functionality of:
prior to user-assigning the selected SIM to the at least one selected electronic display:
determining whether any electronic display among the at least one selected electronic display is currently user-assigned to another SIM; and
in response determining an electronic display among the at least one selected electronic display is currently user-assigned to another SIM, unassigning the at least one selected electronic display from the other SIM.

19. The wireless communication device of claim 7, wherein the program code for applying visual indicators to application icons further comprises program code that enables the device to:
apply a first visual indicator to each application icon displayed on the active GUI based on an active status of the first SIM; and
apply a second visual indicator, different from the first visual indicator, to the application icons displayed on the second active GUI based on the active status of the second SIM.

20. The wireless communication device of claim 8, wherein the program code for applying a different visual indicator to each status bar further comprises program code that enables the device to:
apply a first chromatic color to a first status bar to indicate the first SIM is the active SIM; and
apply an achromatic color to a next status bar associated with the SIM that is not the active SIM.

* * * * *